United States Patent
Cong et al.

(10) Patent No.: US 11,857,948 B2
(45) Date of Patent: Jan. 2, 2024

(54) CHROMATOGRAPHY OF POLYMERS USING PARTICLES COATED WITH GRAPHENE-BASED COMPOSITIONS

(71) Applicant: Dow Global Technologies LLC, Midland, MI (US)

(72) Inventors: Rongjuan Cong, Lake Jackson, TX (US); Albert Parrott, Lake Jackson, TX (US); Charles Michael Cheatham, Lake Jackson, TX (US); Janet Goss, Midland, MI (US)

(73) Assignee: Dow Global Technologies LLC, Midland, MI (US)

( * ) Notice: Subject to any disclaimer, the term of this patent is extended or adjusted under 35 U.S.C. 154(b) by 696 days.

(21) Appl. No.: 16/759,548

(22) PCT Filed: Nov. 2, 2018

(86) PCT No.: PCT/US2018/058979
§ 371 (c)(1),
(2) Date: Apr. 27, 2020

(87) PCT Pub. No.: WO2019/090092
PCT Pub. Date: May 9, 2019

(65) Prior Publication Data
US 2020/0282378 A1    Sep. 10, 2020

Related U.S. Application Data

(60) Provisional application No. 62/580,526, filed on Nov. 2, 2017.

(51) Int. Cl.
*B01J 20/281*    (2006.01)

(52) U.S. Cl.
CPC .......... *B01J 20/281* (2013.01); *B01J 2220/42* (2013.01); *B01J 2220/54* (2013.01)

(58) Field of Classification Search
None
See application file for complete search history.

(56) References Cited

U.S. PATENT DOCUMENTS

| 8,076,147 B2 | 12/2011 | Damme et al. |
| 8,318,896 B2 | 11/2012 | Winniford et al. |
| 8,372,931 B2 | 2/2013 | Hermel-Davidock et al. |
| 2008/0166817 A1 | 7/2008 | Gillespie et al. |
| 2009/0297854 A1 | 12/2009 | Lee et al. |

(Continued)

FOREIGN PATENT DOCUMENTS

| WO | 2012166861 A1 | 12/2012 |
| WO | 2012167035 A2 | 12/2012 |

OTHER PUBLICATIONS

Cong et al., "A New Technique for Characterizing Comonomer Distribution in Polyolefins: High Temperature Thermal Gradient Interaction Chromatography (HT-TGIC)", Macromolecules, 2011, 44 (8), 3062-3072.

(Continued)

Primary Examiner — Vishal V Vasisth
(74) Attorney, Agent, or Firm — Dinsmore & Shohl LLP

(57) ABSTRACT

A packing material for chromatography, the packing material comprising coated particles, wherein the coated particles comprise non-porous particles and a portion of the surface area of the non-porous particles is coated with a coating composition comprising graphene and/or graphene oxide.

11 Claims, 9 Drawing Sheets

(56) References Cited

U.S. PATENT DOCUMENTS

2014/0011034 A1 1/2014 Majumder et al.
2014/0154770 A1 6/2014 Vittadello et al.

OTHER PUBLICATIONS

Cong et al., "High Temperature Thermal Gradient Interaction Chromatography (HT-TGIC) for Microstructure Analysis of Polyolefins", Macromol. Symp., 2012, 312, 108-114.

Ding et al., "Filtration and Transport of Heavy Metals in Graphene Oxide Enabled Sand Columns", Chemical Engineering Journal, 2014, 257, 248-252.

Dong et al., "Graphene-metal interaction and its effect on the interface stability under ambient conditions", Applied Surface Science, 2017, vol. 412, p. 262-270.

Dubey et al., "Green Synthesis of Graphene Sand Composite (GSC) as Novel Adsorbent for Efficient Removal of Cr (VI) Ions from Aqueous Solution", Journal of Water Process Engineering, 2015, 5, 83-94.

Fahey et al., "Application of Metallocene Catalysts to Large-scale Slurry Loop Reactors", Metallocene-based Polyolefins, 2000, 14, 321-332.

Gao et al., "Paper-like graphene-Ag composite films with enhanced mechanical and electrical properties", Nanoscale Res Lett, 2013, 8:32.

Giddings, "Multidimensional Chromatography: Techniques and Applications", Use of Multiple Dimensions in Analytical Separations, in Hernan Cortes Editor, 1st ed.

International Search Report and Written Opinion pertaining to PCT/US2018/058979, dated Feb. 20, 2019.

Lee et al., "Wafer-Scale Synthesis and Transfer of Graphene Films", Nano Lett., 2010, 10, 490-493.

Liang et al., "A novel octadecylsilane functionalized graphene oxide/silica composite stationary phase for high performance liquid chromatography", J. Sep. Sci., 2012, vol. 35, p. 2003-2009.

Liang et al., "Gold Nanoparticle Decorated Graphene Oxide/Silica Composite Stationary Phase for High-Performance Liquid Chromatography", Journal of Separation Science, 2014, 37:12, 1371-1379.

Liang et al., "Layer-by-layer self-assembled graphene oxide/silica microsphere composites as stationary phase for high performance liquid chromatography", Analyst, 2012, vol. 137, p. 5237-5244.

Liu et al., "Graphene and Graphene Oxide Sheets Supported on Silica as Versatile and High-Performance Adsorbents for Solid-Phase Extraction", Angew. Chem. Int. Ed., 2011, vol. 50, p. 5913-5917.

Macko et al., "Separation of Linear Polyethylene from Isotactic, Atactic, and Syndiotactic Polypropylene by High-Temperature Adsorption Liquid Chromatography", Macromolecules, 2009, 42, 6063-6067.

Macko et al., "Separation of Propene/1-Alkene and Ethylene/1-Alkene Copolymers by High-Temperature Adsorption Liquid Chromatography", Polymer, 2009, 50, 5443-5448.

Mattevi et al., "A review of chemical vapour deposition of graphene on copper", J. Mater. Chem., 2011, 21, 3324-3334.

Obraztsov et al., "Chemical vapor deposition of thin graphite films on nanometer thickness," Carbon, 2007, 48, 2017-2021.

Qu et al., "Capillary Coated with Graphene and Graphene Oxide Sheets as Stationary Phase for Capillary Electrochromatography and Capillary Liquid Chromatography", Anal. Chem., 2012, vol. 84, p. 8880-8890.

Qu et al., "Capillary col. coated with graphene oxide as stationary phase for gas chromatography", Analytica Chemica Acta, 2012, vol. 757, p. 83-87.

Roy et al., "Development of Comprehensive Two-Dimensional High Temperature Liquid Chromatography x Gel Permeation Chromatography for Characterization of Polyolefins", Macromolecules, 2010, 43, 3710-3720.

Wang et al., "Magnetic microsphere-confined graphene for the extraction of polycyclic aromatic hydrocarbons from environmental water samples coupled with high performance liquid chromatography-fluorescence analysis", Journal of Chromatography A, 2013, vol. 1293, p. 20-27.

Wang et al., "Graphene-based materials: Fabrication and application for adsorption in analytical chemistry", Journal of Chromatography A, 2014, vol. 1362, p. 1-15.

Written Opinion pertaining to PCT/US2018/058979, dated Dec. 6, 2019.

Xu et al., "C18 functionalized graphene oxide as a novel coating for solid-phase microextraction", J. Sep. Sci., 2012, vol. 35, p. 1531-1537.

Yang et al., "Graphene-coated Materials Using Silica Particles as a Framework for Highly Efficient Removal of Aromatic Pollutants in Water", 2015, 5:1.

Zhang et al., "Graphene-coated Polymeric Anion Exchangers for Ion Chromatography", Analytica Chica Acta, 2017, 970, 73-81.

Zhang et al., Preparation and retention mechanism study of graphene and graphene oxide bonded silica microspheres as stationary phases for high performance liquid chromatography, Journal of Chromatography A, 2013, vol. 1307, p. 135-143.

CHROMATOGRAPHY OF POLYMERS USING PARTICLES COATED WITH GRAPHENE-BASED COMPOSITIONS

CROSS-REFERENCE TO RELATED APPLICATIONS

This application is a National Stage Entry under 35 U.S.C. 071 of International Patent Application No. PCT/US2018/058979, filed Nov. 2, 2018, which claims priority to U.S. Provisional Patent Application Ser. No. 62/580,526, filed Nov. 2, 2017, both of which are incorporated by reference in their entireties.

BACKGROUND OF THE INVENTION

The disclosed invention is directed to a new packing material for in liquid chromatography, especially in the field of high temperature liquid chromatography (HTLC) for polymer analysis. The HTLC techniques for polymers include size exclusion chromatography (SEC) for molecular weight distribution information; high temperature thermal gradient interaction chromatography (HT-TGIC, or abbreviated as TGIC) for comonomer content distribution (CCD); and solvent gradient chromatography for separating by functional group content.

Porous graphite-based packing materials have been used in an attempt to improve the analysis range of comonomer content and/or comonomer content distribution of olefin-based polymers, and especially olefin-based polymers with densities less than 0.970 g/cc (not including fillers or pigments). However, there is typically more than one separation mechanism associated with such packing materials. Chromatographic resolution is better understood when the separation mechanism is exclusively due to one mechanism, or cause. When there are secondary, or even tertiary, mechanisms operating, the resolution of similar components is confounded, and the data is less accurate. In the case of interaction dependent mechanisms, either driven by thermal or by solvent gradients, the presence of a secondary separation, based upon molecular size, a function of molecular weight in homologous polymers, is undesirable. This secondary mechanism is hereafter referred to as the size exclusion chromatography, or SEC, effect. The complex SEC effect is due to the pore size distribution and the pore volume of graphite. Another problem in the HTLC analysis of polymers, and in particular, olefin-based polymers, is the limited separation efficiency obtained by the prior art methods (Cong et al., Macromolecular Symposia, 312, 108 (2012)).

Additional chromatography techniques using carbon-based packing materials are described in the following references: WANG, Journal of Chromatography A, 2013, Vol. 1293, pg. 20-27; XU, J. Sep. Sci., 2012, Vol. 35, pg. 1531-1537; QU, Anal. Chem., 2012, Vol. 84, pg. 8880-8890; QU, Analytica Chemica Acta, 2012, Vol. 757, pg. 83-87; LIU, Angew. Chem. Int. Ed., 2011, Vol. 50, pg. 5913-5917; WANG, Journal of Chromatography A, 2014, Vol. 1362, pg. 1-15; DONG, Applied Surface Science, 2017, Vol. 412, pg. 262-270; LIANG, Analyst, 2012, Vol. 137, pg. 5237-5244; LIANG, J. Sep. Sci., 2012, Vol. 35, pg. 2003-2009; and ZHANG, Journal of Chromatography A, 2013, Vol. 1307, pg. 135-143; Macko et al., *Separation of Propene/1-Alkene and Ethylene/1-Alkene Copolymers by High-Temperature Adsorption Liquid Chromatography*, Polymer 50 (2009), 5443-5448; Macko et al., *Separation of Linear Polyethylene from Isotactic, Atactic, and Syndiotactic Polypropylene by High-Temperature Adsorption Liquid Chromatography*, Macromolecules (2009), 42, 6063-6067; Roy et al., *Development of Comprehensive Two-Dimensional High Temperature Liquid Chromatography×Gel Permeation Chromatography for Characterization of Polyolefins*, Macromolecules (2010), 43, 3710-3720; See also U.S. Publication No. 2010/0093964 (U.S. Pat. No. 8,076,147B2), EP 2,714,226 B1, and U.S. Publication No. 2011/0152499 (U.S. 8,318,8961).

However, there remains a need for packing materials, for high temperature liquid chromatography techniques, that can be used at temperatures up to 160° C., and which provide improved resolution and accuracy, and that decrease analysis time. There is a further need for such materials that do not require the use of costly and labor intensive chemical coupling and/or crosslinking techniques. These needs have been met by the following invention.

SUMMARY OF THE INVENTION

A packing material for chromatography of at least one polymer, said packing material comprising non-porous particles, and wherein a portion of the surface area of the particles is coated with a coating composition comprising graphene and/or graphene oxide, to form coated particles.

DETAILED DESCRIPTION

Figure 1:
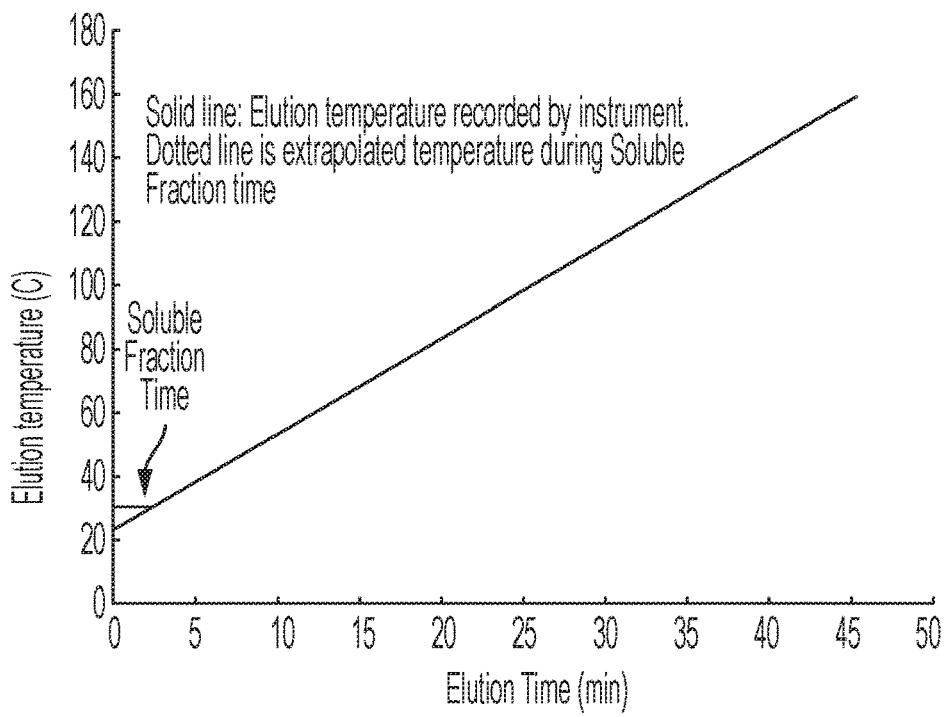
FIG. 1 depicts the measured elution temperature versus elution time by extrapolating for soluble fraction time.

A packing material for the chromatography of polymers, especially olefin-based polymers have been discovered, which provides improved resolution, lower system back pressure, and at lower cost, than current commercially available stationary phases, such as commercially available porous graphite stationary phases. This new material can be reproducibly fabricated without coupling agents, yields improved peak shapes, and provides a simplified separation mechanism that will enable better modelling and SCBD/or CCD deconvolution, leading to a better understanding the microstructure of olefin-based polymers.

It has been unexpectedly discovered that good stable mechanical adherence of graphene coating to a non-porous spherical particles can be achieved. No coupling agent and no intermediate layer between particle surface and the graphene is needed. The coating comprising graphene forms the outer surface on the nonporous (preferably spherical) particles, and the graphene comes into contact with the polymer (olefin-based polymer) solution, during the chromatography process.

A packing material for chromatography, said packing material comprising non-porous particles, and wherein a portion of the surface area of the particles is coated with a coating composition comprising graphene and/or graphene oxide-, to form coated particles.

The packaging material may comprise a combination of two or more embodiments described herein.

A "portion of the surface area of the particles" is from "greater than 0" to 100% of the total surface area of the particles, which is coated by the coating composition. The coating is visibly observed. In one embodiment, from "greater than 0" to 10%, or from "greater than 0" to 20%, or from "greater than 0" to 30%, or from "greater than 0" to 40%, or from "greater than 0" to 50%, of the total surface area of the particles, is coated by the coating composition. In one embodiment, from "greater than 0" to 60%, or from "greater than 0" to 70%, or from "greater than 0" to 80%, or from "greater than 0" to 90%, of the total surface area of the particles, is coated by the coating composition. In one embodiment, from 1% to 10%, or from 2% to 20%, or from 3% to 30%, or from 4% to 40%, or from 5% to 50%, of the total surface area of the particles, is coated by the coating composition.

Typically the coated particles show a uniform appearance, are of a free flowing nature, and show no sign of particle phase separation. The color of the coated particles darkens with increased graphene loading.

In one embodiment, the particles are spherical particles.

In one embodiment, the coating composition comprises graphene.

In one embodiment, the chromatography is of at least one polymer. In a further embodiment, the polymer is an olefin-based polymer. In a further embodiment, the olefin-based polymer is selected from an ethylene-based polymer or a propylene-based polymer. In one embodiment, the olefin-based polymer is an ethylene-based polymer, further an ethylene-based copolymer. In one embodiment, the olefin-based polymer is a propylene-based polymer, further a propylene-based copolymer.

In one embodiment, the ethylene-based polymer is an ethylene/alpha-olefin interpolymer, and further an ethylene/alpha-olefin copolymer. Suitable alpha-olefins include the C3-C10 alpha-olefins, and preferable propylene, 1-butene, 1-hexene and 1-octene.

In one embodiment, the propylene-based polymer is a propylene/alpha-olefin interpolymer, and further a propylene/alpha-olefin copolymer, or a propylene/ethylene interpolymer and further a propylene/ethylene copolymer. Suitable alpha-olefins include the C4-C10 alpha-olefins, and preferable 1-butene, 1-hexene and 1-octene.

In one embodiment, the coating composition comprises ≥(greater than or equal to) 80 wt %, or ≥85 wt %, or ≥90 wt %, or ≥95 wt %, or ≥98 wt %, or ≥99 wt % graphene, based on the weight of the coating composition. In a further embodiment, the particles are spherical particles.

In one embodiment, the coating composition is present in an amount from 1 to 20 wt %, or from 1 to 15 wt %, or from 1 to 10 wt % based on the weight of the coated particles, as determined by TGA. In one embodiment, the coating composition is present in an amount from 2 to 20 wt %, or from 2 to 15 wt %, or from 2 to 10 wt % based on the weight of the coated particles, as determined by TGA. In one embodiment, the coating composition is present in an amount from 3 to 20 wt %, or from 3 to 15 wt %, or from 3 to 10 wt % based on the weight of the coated particles, as determined by TGA. In one embodiment, the coating composition is present in an amount from 3 to 20 wt %, or from 3 to 15 wt %, or from 3 to 10 wt % based on the weight of the coated particles, as determined by TGA. In a further embodiment, the particles are spherical particles.

In one embodiment, the non-porous particles have a porosity less than or equal to (≤) 6.0%, or ≤5.0%, or ≤4.0%, or ≤3.0%, or ≤2.0%, or ≤1.0%, or ≤0.5%, or ≤0.2%, or ≤0.1%, or ≤0.05%, or ≤0.02%, or ≤0.01% for pore sizes from 0.003 to 1 microns. In a further embodiment, the particles are spherical particles. In one embodiment, the particles have a porosity≥zero for pore sizes from 0.003 to 1 microns. In a further embodiment, the particles are spherical particles. In one embodiment, the particles have a porosity of zero for pore sizes from 0.003 to 1 microns. In a further embodiment, the particles are spherical particles.

In one embodiment, the non-porous particles have a porosity≤0.008%, or ≤0.006%, or ≤0.004%, or ≤0.002%, or ≤0.001% for pore sizes from 0.003 to 1 microns. In a further embodiment, the particles are spherical particles. In one embodiment, the particles have a porosity≥zero for pore sizes from 0.003 to 1 microns. In a further embodiment, the particles are spherical particles.

In one embodiment, the non-porous particles have D50≥2 microns, or ≥5 microns, or ≥10 microns, or ≥20 microns. In a further embodiment, the particles are spherical particles. In one embodiment, the particles have a D50≤200 μm, or ≤180 μm, or ≤160 μm, or ≤140 μm. In a further embodiment, the particles are spherical particles.

In one embodiment, the particles have an average diameter (or D50 value)≤200 microns, or ≤190 microns, or ≤180 microns, or ≤170 microns, or ≤150 microns, or ≤140 microns, or ≤130 microns. In a further embodiment, the non-porous particles are spherical particles. In one embodiment, the non-porous particles have an average diameter (or D50 value)≥40 microns, or ≥50 microns, or ≥60 microns, or ≥70 microns, or ≥80 microns, or ≥90 microns, or ≥100 microns. In a further embodiment, the particles are spherical particles. In one embodiment, the particles have an average diameter from 1 to 200 microns, or from 10 to 180, or from 20 to 160 microns. In a further embodiment, the particles are spherical particles.

In one embodiment, the non-porous particles have a D90<4*D50, or a D90<3*D50, or a D90<2*D50. In a further embodiment, the particles are spherical particles. In a further embodiment, the particles are spherical particles. In one embodiment, the particles have a D10>D50/10, or a D10>−D50/8, a D10>D50/6, or a D10>D50/4. In a further embodiment, the particles are spherical particles.

In one embodiment, the non-porous particles have a particle size distribution, such that $D_{10}$≥2 microns, D90≤3.1×D50, and the ratio of (D90−D10)/D50<3.5, further <3.0, further <2.0, further <(less than) 1.5, and further <1.3. In a further embodiment, the particles are spherical particles.

In one embodiment, the coated particles have a D90<4*D50, or a D90<3*D50, or a D90<2*D50. In a further embodiment, the coated particles are spherical particles. In a further embodiment, the coated particles are spherical particles. In one embodiment, the coated particles have a D10>D50/10, or a D10>−D50/8, a D10>D50/6, or a D10>D50/4. In a further embodiment, the coated particles are spherical particles.

In one embodiment, the coating composition comprises ≤1.00 wt %, or ≤0.50 wt %, or ≤0.20 wt %, or ≤0.10 wt %, or ≤0.05 wt %, or ≤0.02 wt %, or ≤0.01 wt %, or ≤0.001 wt % of graphene oxide, based on the weight of the coating composition. In a further embodiment, the particles are spherical particles.

In one embodiment, the non-porous particles are selected from the following: metal, silicates (for example, lime glass), diamond, silicon carbide, metal particles, clays, talc, or a combination thereof. In one embodiment, the particles are glass beads or silicon carbide beads. In one embodiment, the particles are silica or glassy carbon particles. In a further embodiment, the particles are spherical particles.

In one embodiment, the non-porous particles do not comprise a surface treatment, such as a coupling agent. Coupling agents are chemicals, which comprises a chemical group capable of reacting with the base particle, to form a chemical bond, and another chemical group capable of reacting with graphene and/or graphene oxide to form a chemical bond. Thus, the graphene and/or graphene oxide is bonded to the base particle via the reacted coupling agent.

In one embodiment, the coated particles do not comprise a coupling agent.

In one embodiment, the coating composition does not comprise a crosslinking agent.

In one embodiment, wherein for each coated particle, there is no material located between the outer surface of the particle and the coating composition. In one embodiment, wherein for each coated particle, the coating composition is in contact with the outer surface of the particle.

In one embodiment, the non-porous particles have a total surface area greater than or equal to (≤) 100 $m^2/g$, or ≤90 $m^2/g$, or ≤80 $m^2/g$, or ≤70 $m^2/g$, or ≤60 $m^2/g$ (square meter per grams of particles). In a further embodiment, the particles are spherical particles. In one embodiment, the particles have a total surface area≥1 $m^2/g$, or ≥2 $m^2/g$, or ≥3 $m^2/g$, or ≥4 $m^2/g$, or ≥5 $m^2/g$ (square per grams of particles). In a further embodiment, the non-porous particles are spherical particles.

In one embodiment, the non-porous particles have a total surface area≤50 $m^2/g$, or ≤40 $m^2/g$, or ≤30 $m^2/g$, or ≤20 $m^2/g$, or ≤10 $m^2/g$ (square meter per grams of particles). In a further embodiment, the particles are spherical particles. In one embodiment, the particles have a total surface area≥1 $m^2/g$, or ≥2 $m^2/g$, or ≥3 $m^2/g$, or ≥4 $m^2/g$, or ≥5 $m^2/g$ (square per grams of particles). In a further embodiment, the particles are spherical particles.

In one further embodiment, the coated particles comprise ≥90 wt % of the particles, based on the weight of the coated particles. In a further embodiment, the particles comprises ≥95 wt %, further ≥98 wt %, further ≥99 wt % of the particles, based on the weight of the coated particles. In a further embodiment, the particles are spherical particles.

In one embodiment, the "packing material" is thermally stable at a temperature range from −15° C. to 230° C. In one embodiment, the "packing material" is chemically stable at a temperature range from −15° C. to 230° C. In one embodiment, the "packing material" is thermally and chemically stable at a temperature range from −15° C. to 230° C.

Chemically stable means that the packing material does not undergo chemical reaction with mobile phase or with polymer solution; and does not undergo thermal decomposition. Thermally stable describes a packing material, which at the temperature(s) of operation, does not undergo substantial thermal expansion or contraction, which expansion or contraction causes the column bed to move or to generate voids, or which causes deterioration of the column performance in a relatively short period of time.

In one embodiment, the coated particles are subject to a further thermal treatment in the presence of a gas or a gas mixture, selected from the following: ethane, methane, argon, hydrogen, air, and nitrogen.

In one embodiment, the coated particle is subject to a further thermal treatment in the presence of a gas or a mixture of gases in the presence of inorganic salts, for example, NaCl, $BaCl_2$, or inorganic compounds, such as $Al_2O_3$.

In one embodiment, the packing material comprises at least one filler (for example, an inert filler). Fillers include, but are not limited to, inorganic materials, such as, but not limited to, glass, and stainless steel shot.

Also is provided is an apparatus for polymer chromatography, comprising at least one column that comprises the packaging material of any one of the embodiments described herein.

In one embodiment, the apparatus further comprises a detector selected from an Infrared (IR) detector, a Differential Reflective Index Detector (DRI), an Evaporative Light Scattering Detector (ELSD), UV-vis detector or a Differential Viscometer (DP).

In one embodiment, the apparatus further comprises a means to subject the packing material to a temperature gradient. In a further embodiment, the temperature gradient (cooling or heating) is ≥0.5° C. per minute, or ≥1.0° C. per minute, or ≥2.0° C. per minute. A temperature gradient device (for example, a GC oven (Agilent Technologies), used in a CEF from PolymerChar) is an instrument that is used to thermally treat, or cool, a column (for example, a chromatography column) in a controlled manner. Other examples are Hewlett Packard GC ovens, and Analytical TREF ovens (for example, see Gillespie et al., U.S. 2008/0166817A1).

In one embodiment, the apparatus further comprises a means to subject the packing material to a solvent gradient. A solvent gradient device (for example, a dual pump system with a mixer (Agilent Technologies) as available from PolymerChar) is an instrument that is used to mix two or more solvents in a controlled manner, and wherein the solvent mixture is used as an eluent in a column (for example, a chromatography column). Examples include binary Shimadzu LC-20 AD pumps (see Roy et al, Development of Comprehensive Two-Dimensional High Temperature Liquid Chromatography×Gel Permeation Chromatography for Characterization of Polyolefins, Macromolecules 2010, 43, 3710-3720) and binary Agilent pumps from HT-LC instruments (PolymerChar).

In one embodiment, the apparatus further comprises a means to subject the packing material to a temperature gradient, and a means to subject the packing material to a solvent gradient, for example, by using a combination of at least one oven and at least one pump as described above. In a further embodiment, the temperature gradient during cooling is ≥0.1° C. per minute, or ≥0.5° C. per minute, or ≥1.0° C. per minute, or ≥5.0° C. per minute, or ≥10.0° C. per minute, or ≥20.0° C. per minute or ≥30.0° C. per minute. In a further embodiment, the temperature gradient during heating is ≥0.1° C. per minute, or ≥0.5° C. per minute, or ≥1.0° C. per minute, or ≥5.0° C. per minute, or ≥10.0° C. per minute, or ≥20.0° C. per minute.

In one embodiment, apparatus further comprises a means to subject the packing material to a solvent gradient, while retaining the polymer fractions on the column at the end of solvent gradient, followed by a mean to subject the packing material to a temperature gradient, for example, by using a combination of at least one oven and at least one pump as described above. In a further embodiment, simultaneous solvent gradient and temperature gradient is used, which leads to a further improved resolution, and/or further improved detector quantification ability, and/or a further reduction of analysis time. In a further embodiment, the solvent gradient uses, but is not limited to, decane and ODCB as a solvent pair. In a further embodiment, the temperature gradient is ≥0.1° C. per minute during cooling, or ≥1.0° C. per minute during heating.

In one embodiment, the apparatus further comprises a second packing material that is different from the first packing material. For example, the second packing material may differ from the first packing material in one or more features, such as, chemical composition, mean particle size, particle size distribution, pore size and/or pore size distribution.

In one embodiment, the apparatus further comprises a means to subject the second packing material to a temperature gradient, for example by a combination of the ovens and pumps in the PolymerChar apparatus described above. In a further embodiment, the temperature gradient is ≥0.1° C. per minute, or ≥0.5° C. per minute, or ≥1.0° C. per minute, or ≥2.0° C. per minute. Suitable temperature gradient devices are discussed above.

In one embodiment, the apparatus further comprises a means to subject the second packing material to a solvent gradient. Suitable solvent gradient devices are discussed above.

In one embodiment, the apparatus further comprises a means to subject the second packing material to both a temperature gradient and a solvent gradient, for example, by using a combination of at least one oven and at least one pump as described above. In a further embodiment, the temperature gradient is ≥0.1° C. per minute, or ≥0.5° C. per minute, or ≥1.0° C. per minute, or ≥2.0° C. per minute.

In one embodiment, the apparatus is connected, in-line, at-line or on-line, to either a polymerization process or an isolation process of the polymer.

In one embodiment, the eluent is selected from the following: TCB, ODCB, TCE, naphthalene, C10 or higher aliphatic alcohol, decane, dibutoxymethane, or xylene with DRI, ELSD.

One or more embodiments provide chromatography methods to analyze a polymer, the method comprising:

a) dissolving a composition comprising the polymer in at least one solvent, to form a polymer solution;

b) injecting at least a portion of the polymer solution onto a column, comprising the packaging material of one or more embodiments described herein;

c) generating a chromatogram.

In one embodiment, after step b), the packaging material is cooled at a rate≥0.2° C./min, or ≥0.5° C./min, or ≥1.0° C./min, or ≥1.5° C./min, or ≥2.0° C./min, or ≥3.0° C./min, or ≥4.0° C./min, or ≥5.0° C./min, or ≥6.0° C./min, or ≥7.0° C./min, or ≥8.0° C./min, or ≥9.0° C./min, or ≥10.0° C./min, or ≥11.0° C./min, or ≥12.0° C./min, or ≥13.0° C./min, or ≥14.0° C./min, or ≥20.0° C./min, 25 or ≥30.0° C./min.

In one embodiment, before step c), the packaging material is heated at a rate≥0.2° C./min, or ≥0.5° C./min, or ≥1.0° C./min, or ≥1.5° C./min, or ≥2.0° C./min, or ≥3.0° C./min, or ≥4.0° C./min, or ≥5.0° C./min, or ≥6.0° C./min, or ≥7.0° C./min, or ≥8.0° C./min, or ≥9.0° C./min, or ≥10.0° C./min, or ≥11.0° C./min, or ≥12.0° C./min, or ≥13.0° C./min, or ≥14.0° C./min, or ≥20.0° C./min, 25 or ≥30.0° C./min.

In one embodiment, a flow of eluent is maintained through the packing material. In one embodiment, the eluent flows through the packing material at a rate≤0.5 ml/min during cooling. In one embodiment, the flow rate of the eluent, through the packing material is from 0.5 to 3.0 mL/min, or from 0.5 to 2.0 mL/min or from 2.0 mL/min to 10 mL/min, or from 0.5 to 1.0 mL/min during heating. In one embodiment, the eluent comprises less than 1000 ppm water, based on the weight of the eluent.

In one embodiment, a flow of eluent is maintained through the packing material. In one embodiment, the eluent flows through the packing material at a rate≤0.01 ml/min during cooling. In one embodiment, the flow rate of the eluent, through the packing material is from 0.01 to 0.5 mL/min, or from 0.01 to 0.4 mL/min or from 0.01 mL/min to 0.3 mL/min.

In one embodiment, the eluent is selected from the following: TCB, ODCB, TCE, naphthalene, C10 or higher aliphatic alcohol, decane, xylene.

In one embodiment, the polymer is an olefin-based polymer. In one embodiment, the olefin-based polymer is an ethylene-based polymer. In one embodiment, the olefin-based polymer is a propylene-based polymer.

In one embodiment, the olefin-based polymer has a density from 0.850 to 0.960 g/cc, or from 0.860 to 0.960, or from 0.870 to 0.960 g/cc (1 cc=1 cm$^3$). In one embodiment, the olefin-based polymer is an ethylene-based polymer. In one embodiment, the olefin-based polymer is a propylene-based polymer.

In one embodiment, the polymer has a concentration in the solution of greater than 0.1 milligrams polymer per milliliter of solution. In a further embodiment, the polymer is an olefin-based polymer. In one embodiment, the olefin-based polymer is an ethylene-based polymer. In one embodiment, the olefin-based polymer is a propylene-based polymer.

In one embodiment, a simultaneous solvent gradient and temperature gradient is used, which leads to a further improved resolution, and/or further improved detector quantification ability, and/or a further reduction of analysis time. In a further embodiment, the solvent gradient uses, but is not limited to, decane and ODCB as a solvent pair. In a further embodiment, the temperature gradient is ≥0.1° C. per minute during cooling, or ≥1.0° C. per minute during heating.

In one embodiment, the chromatography method is used to determine the short chain branching distribution of the olefin-based polymer. In one embodiment, the chromatography method is used to determine the comonomer content of the olefin-based polymer.

In one embodiment, chromatography method further comprises one of the following: i) a flow of solvent during at least one cooling stage, or ii) a flow of solvent during at least one cooling stage, in combination with a temperature rising elution fractionation (TREF) chromatography, or iii) a solvent gradient HTLC.

The inventive chromatography method can be coupled, on or off line, with other analytical methods; for example, a multidimensional chromatography. For example, the effluent from an SEC column, containing a copolymer of a selected molecular size, can be analyzed by the chromatography method to determine the comonomer ratio of the selected molecular sizes. See also Roy et al., Development of Comprehensive Two-Dimensional High Temperature Liquid Chromatography×Gel Permeation Chromatography for Characterization of Polyolefins, Macromolecules (2010), 43, 3710-3720; Gillespie et al., "APPARATUS AND METHOD FOR POLYMER CHARACTERIZATION", US2008/0166817A1; each incorporated herein by references.

The term "multidimensional chromatography," as used herein, refers to the coupling together of multiple separation mechanisms (for example, see J. C. Giddings (1990), Use of Multiple Dimensions in Analytical Separations, in Hernan Cortes Editor, *Multidimensional Chromatography: Techniques and Applications* (1st ed. pp. 1), New York, NY: Marcel Dekker, Inc.).

The inventive chromatography method can be used in a preparative scale, where large quantity of polymer (in the term of grams, kilograms) is fractionated according to its CCD. The inventive chromatography method can be used in at-line process control and/or quality control to provide a fast feedback of CCD and/or SCBD and deconvolution for olefin-based polymer.

The inventive chromatography method may comprise a combination of two or more embodiments as described herein. The inventive apparatus may comprise a combination of two or more embodiments as described herein. The packaging material may comprise a combination of two or more embodiments as described herein.

Polymers

The packing materials, and apparatus and methods using the same, can be used to analyze polymers, such as, for example, the measurement of CCD and/or short chain branching distribution (SCBD) of olefin-based polymers, such as ethylene-based polymers, and propylene-based polymers. Other suitable polymers are formed from aliphatic and aromatic hydrocarbons, optionally containing heteroatoms.

In one embodiment, the olefin-based polymer is an ethylene-based polymer.

In one embodiment, the olefin-based polymer is an ethylene/alpha-olefin interpolymer. In a further embodiment, the alpha-olefin is a C3-C10 alpha-olefin, and preferably selected from propylene, 1-butene, 1-hexene, and 1-octene.

In one embodiment, the olefin-based polymer is an ethylene/alpha-olefin copolymer. In a further embodiment, the alpha-olefin is a C3-C10 alpha-olefin, and preferably selected from propylene, 1-butene, 1-hexene, and 1-octene.

In one embodiment, the olefin-based polymer is a copolymer of ethylene and an alpha-olefin. In a further embodiment, the alpha-olefin is 1-butene or 1-octene.

In one embodiment, the olefin-based polymer is a polyethylene homopolymer.

In one embodiment, the olefin-based polymer is a propylene-based polymer.

In one embodiment, the olefin-based polymer is a propylene/alpha-olefin interpolymer. In a further embodiment, the alpha-olefin is ethylene, or C4-C10 alpha-olefin, and preferably selected from ethylene, 1-butene, 1-hexene, and 1-octene.

In one embodiment, the olefin-based polymer is a propylene/alpha-olefin copolymer. In a further embodiment, the alpha-olefin is C2, or C4-C10 alpha-olefin, and preferably selected from ethylene, 1-butene, 1-hexene, and 1-octene.

In one embodiment, the olefin-based polymer is a polypropylene homopolymer.

In one embodiment, the olefin-based polymer has a density≤0.970 g/cc; or ≤0.960 g/cc; or ≤0.950 g/cc (1 cc=1 cm$^3$). In one embodiment, the olefin-based polymer has a density≤0.940 g/cc; or ≤0.930 g/cc; or ≤0.920 g/cc. In one embodiment, the olefin-based polymer has a density≤0.910 g/cc; or ≤0.900 g/cc; or ≤0.890 g/cc. In one embodiment, the olefin-based polymer has a density≥0.850 g/cc; or ≥0.860 g/cc; or ≥0.870 g/cc. In one embodiment, the olefin-based polymer has a density from 0.830 g/cc to 0.960 g/cc, or from 0.840 g/cc to 0.950 g/cc, or from 0.850 g/cc to 0.940 g/cc.

In one embodiment, the olefin-based polymer comprises from 2 mole percent to 29 mole percent of an alpha-olefin, as determined by $^{13}$C NMR. Preferred alpha-olefins are discussed above. In one embodiment, the olefin-based polymer comprises from 5 mole percent to 9 mole percent of an alpha-olefin, as determined by $^{13}$C NMR. Preferred alpha-olefins are discussed above.

Olefin-based polymers include, but are not limited to, low density polyethylene (LDPE), high density polyethylene (HDPE), heterogeneously branched linear polymers (include Ziegler-Natta polymerized polymers, such as LLDPE, and include products such as DOWLEX Linear Low Density Polyethylene (LLDPE) available from The Dow Chemical Company), homogeneously branched substantially linear polymer (such as AFFINITY Polyolefin Plastomers and ENGAGE Polyolefin Elastomers, both available from The Dow Chemical Company) homogeneously branched linear polymers (such as EXACT Polymers available from ExxonMobil), olefin multiblock copolymers (such as INFUSE and INTUNE Olefin Block Copolymers available from The Dow Chemical Company). Olefin-based polymers also include polypropylene homopolymers, impact propylene based copolymers, and random propylene based copolymers. An olefin-based polymer may comprise a combination of two or more embodiments as described herein.

Ethylene copolymers include, but are not limited to, ethylene vinyl acetate (such as Elvax® available from E.I. DuPont deNemours and Company), ethylene/alkyl (meth) acrylate copolymers (such as Elvaloy® available from E.I. DuPont deNemours and Company), ethylene/alkyl (meth) acrylic acid copolymers (such as Nucrel® available from E.I. DuPont deNemours and Company or PRIMACOR available from S.K. Global Chemical), ionomers derived from ethylene/(meth)acrylic acid copolymers (such as Surlyn® available from E.I. DuPont deNemours and Company), and/or anhydride-modified copolymers (such as Fusabond® available from E.I. DuPont deNemours and Company). The ethylene acid copolymers include, but are not limited to, those containing a softening comonomer selected from the group consisting of vinyl esters, alkyl vinyl esters, and alkyl (meth)acrylates. Suitable examples of alkyl acrylates include, but are not limited to, ethyl acrylate, methyl acrylate, n-butyl acrylate, iso-butyl acrylate, or combinations thereof. In various embodiments, the alkyl acrylate has an alkyl group with from 1 to 8 carbons. In various embodiments, the anhydride-modified copolymer is a maleic anhydride-grafted ethylene-based polymer in which an ethylene-based polymer has a maleic anhydride grafting monomer grafted thereto. Suitable ethylene-based polymers for the maleic anhydride-grafted ethylene-based polymer include, without limitation, polyethylene homopolymers and copolymers with α-olefins, copolymers of ethylene and vinyl acetate, and copolymers of ethylene and one or more alkyl (meth)acrylates.

Definitions

Unless stated to the contrary, implicit from the context, or customary in the art, all parts and percents are based on weight, and all test methods are current as of the filing date of this disclosure.

The term "packing material," as used herein, refers to the stationary phase or the substrate of a column, for example, a stainless steel column used for HT-TGIC (thermal gradient) and HTLC (in solvent gradient).

The term "graphene," as used herein, refers to the carbon layers in graphite. It is in a form of platelets in solid form. Graphene is a two-dimensional carbon allotrope with the carbon atoms arranged in a two-dimensional honeycomb lattice. Graphene has a low density of 0.03 to 0.60 g/mL. It is impossible to use graphene alone as packing material for HT-TGIC (for example) due to high back pressure and poor short-term and long-term column bed stability. The graphene does not contain a bonded coupling agent (for example, carboxylic acid containing compounds).

The term "graphene oxide," as used herein, refers to the oxidized graphene. It is impossible to use graphene oxide alone as packing material for HT-TGIC (for example) due to high back pressure and poor short-term and long-term column bed stability. The graphene oxide does not contain a bonded coupling agent (for example, carboxylic acid containing compounds).

The term "non-porous particles," as used herein, refers to particles that have a porosity≤6.0%, for base particle in the pore size range 0.003 to 1.0 microns. See Mercury Porosimetry for Pore Size Distribution and Porosity.

The term "spherical particles," as used herein, refers to totally round, or almost round particles. The number average ratio of "largest diameter" to "smallest diameter" of the sample $$\left( \frac{\sum_{i=1}^{n100} \left( \frac{\text{largest diameter}}{\text{Smallest diameter}} \right)_i}{\sum_{n=1}^{n100} ni} \right),$$

where $n_i$ is the particle number i) is from 3.0 to 1.0. The ratio of 1.0 indicates the perfect spherical particle. A sample containing at least 100 particles that are randomly selected, is determined by scanning electron microscopy (SEM).

The term "average diameter," as used in reference to the spherical particles, refers to the D50 value.

The term "solvent," as used herein, refers to a substance, or a mixture of substances (for example, liquids), capable of dissolving another substance (solute).

The term "eluent," as used herein, refers to a solvent used in a chromatography process to move, or elute, one or more substances from a stationary support material.

The term "polymer," as used herein, refers to a polymeric compound prepared by polymerizing monomers, whether of the same or a different type. The generic term polymer thus embraces the term homopolymer (employed to refer to polymers prepared from only one type of monomer, with the understanding that trace amounts of impurities can be incorporated into the polymer structure), and the term interpolymer as defined hereinafter. Trace amounts of impurities, for example, catalyst residues, may be incorporated into and/or within a polymer.

The term "interpolymer," as used herein, refers to polymers prepared by the polymerization of at least two different types of monomers. The generic term interpolymer includes copolymers (employed to refer to polymers prepared from two different monomers), and polymers prepared from more than two different types of monomers.

The term "olefin-based polymer," as used herein, refers to a polymer that comprises a 50 wt % or a majority amount of polymerized olefin monomer, for example ethylene or propylene, (based on weight of the polymer) and, optionally, at least one comonomer.

The term "ethylene-based polymer," as used herein, refers to a polymer that comprises 50 wt % or a majority amount of polymerized ethylene monomer (based on weight of the polymer) and, optionally, at least one comonomer.

The term "ethylene-based interpolymer," as used herein, refers to an interpolymer that comprises 50 wt % or a majority amount of polymerized ethylene monomer (based on weight of the interpolymer) and at least one comonomer.

The term "ethylene/α-olefin interpolymer," as used herein, refers to an interpolymer that comprises 50 wt % or a majority amount of polymerized ethylene monomer (based on the weight of the interpolymer) and at least one α-olefin.

The term, "ethylene/α-olefin copolymer," as used herein, refers to a copolymer that comprises 50 wt % or a majority amount of polymerized ethylene monomer (based on the weight of the copolymer), and an α-olefin, as the only two monomer types.

The term, "polyethylene homopolymer," as used herein, refers to a polymer that comprises only polymerized ethylene monomer.

The term "propylene-based polymer," as used herein, refers to a polymer that comprises a majority amount of polymerized propylene monomer (based on weight of the polymer) and, optionally, at least one comonomer.

The term "propylene-based interpolymer," as used herein, refers to an interpolymer that comprises a majority amount of polymerized propylene monomer (based on weight of the interpolymer) and at least one comonomer.

The term "propylene-based copolymer," as used herein, refers to a copolymer that comprises a majority amount of polymerized propylene monomer (based on weight of the copolymer) and one comonomer, as the only two monomer types.

The term "propylene/α-olefin interpolymer," as used herein, refers to an interpolymer that comprises a majority amount of polymerized propylene monomer (based on the weight of the interpolymer) and at least one α-olefin.

The term, "propylene/α-olefin copolymer," as used herein, refers to a copolymer that comprises a majority amount of polymerized propylene monomer (based on the weight of the copolymer), and an α-olefin, as the only two monomer types.

The term, "ethylene polar copolymer," as used herein, refers to a copolymer of ethylene and at least one comonomer, wherein the ethylene polar copolymer comprises a majority amount of polymerized ethylene monomer (based on the weight of the copolymer) on the polymer chain, and also comprises at least one polar component chemically bonded to the polymer chain after polymerization, for example, LLDPE grafted with MAH.

The term, "polar comonomers," as used herein, refers to a monomer consisting of at least one unsaturated double C=C bond and one atom not hydrogen or carbon in its chemical structure, such as maleic anhydride, n-butyl acrylate, glycidyl methacrylate copolymer, methyl acrylate as the only two monomer types.

The term "acid copolymer" as used herein refers to a polymer comprising copolymerized units of an α-olefin, an α, β-ethylenically unsaturated carboxylic acid, and optionally other suitable commoner(s) such as, an α, β-ethylenically unsaturated carboxylic acid ester.

The term "(meth)acrylic", as used herin, alone or in combined form, such as "(meth)acrylate", refers to acrylic or methacrylic, for example, "acrylic acid or methacrylic acid", or "alkyl acrylate or alkyl methacrylate".

The term "ionomer" as used herin refers to a polymer that comprises ionic groups that are carboxylate salts, for example ammonium carboxylates, alkali metal carboxylates, alkaline earth carboxylates, transition metal carboxylates, and/or combinations of such carboxylates. Such polymers are generally produced by partially or fully neutralizing the carboxylic acid groups of precursor or parent polymers that are acid copolymers, as defined herein, for example by reaction with a base. An example of an alkali metal ionomer as used herein is a zinc/sodium mixed ionomer (or zinc/sodium neutralized mixed ionomer), for example a copolymer of ethylene and methacrylic acid wherein all or a portion of the carboxylic acid groups of the copolymerized methacrylic acid units are in the form of zinc carboxylates and sodium carboxylates.

The term "composition," as used herein, includes a mixture of materials which comprise the composition, as well as reaction products and decomposition products formed from the materials of the composition.

The term "temperature gradient chromatography," as used herein, refers to a separation technique, typically a polymer separation, based on a temperature gradient. Preferred examples include TREF and CEF.

The term "TREF," as used herein, refers to Temperature Rising Elution Fractionation chromatography that uses a separation technique based on the different crystallizations of the polymer molecules within a polymer sample, and which uses a static or zero eluent flow during the crystallization (cooling) of the polymer sample onto a stationary support.

The term "CEF," as used herein, refers to Crystallization Elution Fractionation chromatography that uses a separation technique based on the different crystallizations of the polymer molecules within a polymer sample, and which uses a dynamic eluent flow during the crystallization (cooling) of the polymer sample onto a stationary support.

The term "HT-TGIC," as used herein, refers to High Temperature Thermal Gradient Interaction Chromatography (HT-TGIC), a separation technique to analyze CCD and/or SCBD distributions in olefin based polymers (Cong et al., Macromolecules, 2011, 44, 3062-3072). This chromatography is based on the interaction of the graphite with a polymer sample, and uses either dynamic eluent or static flow during the cooling of the polymer sample onto a stationary support, and subsequent elution during heating of the polymer samples from a stationary support.

The term "CCD", as used herein, refers to the chemical composition distribution of polymer. For olefin-based polymers, CCD is defined as the Comonomer Composition Distribution of the polymers, which are obtained through the techniques, such as TREF, or CEF or HT-TGIC.

The term "SCBD", as used herein, refers to the chemical composition distribution of polymer. For olefin-based polymers, SCBD is defined as the Short Chain Branching Distribution of the polymers, which are obtained through the techniques, such as TREF, or CEF or HT-TGIC.

The terms "comprising," "including," "having," and their derivatives, are not intended to exclude the presence of any additional component, step or procedure, whether or not the same is specifically disclosed. In order to avoid any doubt, all compositions claimed through use of the term "comprising" may include any additional additive, adjuvant, or compound, whether polymeric or otherwise, unless stated to the contrary. In contrast, the term, "consisting essentially of" excludes from the scope of any succeeding recitation any other component, step or procedure, excepting those that are not essential to operability. The term "consisting of" excludes any component, step or procedure not specifically listed.

Test Methods

Density

Samples are prepared according to ASTM D 1928. Measurements are made within one hour of sample pressing, using ASTM D792, Method B.

Melt Index

Melt index, MI or $I_2$, is measured in accordance with ASTM D 1238, Condition 190° C./2.16 kg, and is reported in grams eluted per 10 minutes. The "$I_{10}$" melt index is measured in accordance with ASTM D 1238, Condition 190° C./10 kg, and is reported in grams eluted per 10 minutes. For propylene-based polymers, the melt flow rate (MFR) is measured in accordance with ASTM D-1238, condition 230° C./2.16 kg.

High Temperature Size Exclusion Chromatography

The chromatographic system consists of either a Polymer Laboratories Model PL-210 (Agilent) or a Polymer Laboratories Model PL-220 (Agilent) or PolymerChar HT GPC (Spain). The column and carousel compartments are operated at 140° C. Three Polymer Laboratories, 10-µm Mixed-B columns are used with a solvent of 1,2,4-trichlorobenzene. The samples are prepared at a concentration of "0.1 g of polymer" in "50 mL of solvent" or "16 mg of polymer in 8 mL of solvent." The solvent used to prepare the samples contain 200 ppm of BHT. Samples are prepared by agitating lightly for four hours, at 160° C. The injection volume used is "100 microliters," and the flow rate is "1.0 mL/min." Calibration of the GPC column set is performed with twenty one narrow molecular weight distribution polystyrene standards purchased from Polymer Laboratories. The molecular weight (MW) of the standards ranges from 580 to 8,400,000 g/mol, and the standards are contained in six "cocktail" mixtures. Each standard mixture has at least a decade of separation between individual molecular weights. The standards are purchased from Polymer Laboratories (Shropshire, UK). The polystyrene standards are prepared at "0.001 g in 20 mL of solvent" for molecular weights equal to, or greater than, 1,000,000 g/mol, and at "0.005 g in 20 mL of solvent" for molecular weights less than 1,000,000 g/mol.

The polystyrene standard peak molecular weights are converted to polyethylene molecular weights using Equation 1:

$$M_{polyethylene} = A(M_{polystyrene})^B \quad \text{(Eq. 1)},$$

where M is the molecular weight, A has a value of 0.4316 and B is equal to 1.0 (T. Williams and I. M. Ward, *Polym. Letters*, 6, 621-624 (1968)). A third order polynomial is determined to build the logarithmic molecular weight calibration as a function of elution volume. Polyethylene equivalent molecular weight calculations are performed using GPCOne software for PolymerChar GPC instrument. Polydispersity (PDI) is defined as the ratio of weight average molecular weight (Mw) divided by number average molecular weight (Mn)

High Temperature Size Exclusion Chromatography (HT-SEC) for Size Exclusion Effect The purpose of the HT-SEC experiments was to quantify the difference in the size exclusion chromatographic property between this invention and those of a commercial graphite column. The SEC effect of the substrate is highly undesired when using HTLC and HT-TGIC to quantify SCBD of olefin-based polymers. This SEC effect introduces errors into the adsorption based separation mechanism of HTLC of polyolefins.

The standard column configuration consisted of a stainless steel tube, 100 mm length×4.6 mm internal diameter (L×D), with stainless steel frits of 2 µm porosity from Valco. The commercial HYPERCARB graphite column (100×4.6 mm, 5 micron graphite particles) was purchased from Thermo Fisher. The inventive substrates, and the base particles before coating were packed into a stainless steel tube, 100×4.6 mm (L×D), with stainless steel frits of 2 µm porosity from Valco.

All SEC data was obtained using a commercial SEC instrument manufactured by Polymer Char, of Spain. This instrument was equipped with an IR5 infrared detector. Distilled o-dichlorobenzene (ODCB) was used as the mobile phase. The flow rate for all of the columns was set at 0.3 mL/min. A 140 µL and was used. Narrow distribution polystyrene (PS) standards (Polymer Laboratories, UK), with reported molecular weights of 8,400,000 Dalton, 2,950,000 Dalton, 492,500 Dalton, 151,700 Dalton, 49,170 Dalton, 21,000 Dalton and 3,250 Dalton, were used. Each narrow distribution polystyrene standard was dissolved in ODCB at 150° C. for 15 minutes. The concentration of PS was 0.3 mg/mL. The retention volume is defined as the retention volume at the peak of polystyrene standards.

High Temperature Thermal Gradient Interaction Chromatography

HT-TGIC measurement uses a commercial Crystallization Elution Fractionation instrument (CEF) (Polymer Char, Spain), to perform high temperature thermal gradient interaction chromatography (HT-TGIC) measurement (Cong, et al., Macromolecules, 2011, 44 (8), 3062-3072). The CEF instrument is equipped with an IR-5 detector (such as that sold commercially from PolymerChar, Spain). Ortho-dichlorobenzene (ODCB, 99% anhydrous grade) and Silica gel 40 (particle size 0.2-0.5 mm) (such as commercially available from EMD Chemicals) are used. The silica gel is dried in a vacuum oven at 160° C. for at least two hours before use. The ODCB is sparged with dried nitrogen ($N_2$) for one hour before use. The ODCB is further dried by pumping the ODCB through a column or columns packed with dried silica, at 0.1 mL/min to 2.0 ml/min. Dried ODCB was hereinafter referred to as "ODCB." The stock solution of Blend 4 (a mixture of EO1, EO2, EO3 and EO4 as 1:1:1:1 (wt:wt:wt:wt) was used for HT-TGIC analysis, by dissolving at 150° C., for 60 minutes, with shaking by autosampler. The experimental parameters were: stabilization temperature of 150.0° C.; thermal cooling rate of 3.0/min from 150.0 to 30.0° C.; isothermal time at 30.0° C., at 2.0 minutes flow rate during cooling at zero; Soluble Fraction time (SF) of 2 minutes; elution flow rate of 0.5 mL/min; elution thermal rate at 3° C./min from 30.0° C. to 160.0° C.; injection loop of 140 uL. The raw chromatogram was exported with GPCOne software. For the SF time, the elution temperature was extrapolated by using elution thermal rate as shown in FIG. 1. The elution temperature of rest of the elution time was recorded by the instrument as RTD elution temperature.

Particle Size Distribution Analysis (Uncoated Base Particles)

The laser diffraction particle size analyzer utilizes the Fraunhofer theory of light scattering. Laser diffraction based particle size analysis is based on particles passing through a laser beam scatter light, at an angle where the scattered light intensity is directly related to the size of particle. A Beckman Coulter LS13 320 laser diffraction instrument, equipped with a Universal Liquid Module, was used to determine the particle size distribution of the base particles prior to coating). A sample (0.25 gram) was dispersed in 40 ml of clean and bubble free deionized water (DI). The instrument does a routine background check before the actual run, and subtracts any particles that may be present, before loading the particles to be analyzed. The mixture was stirred with a magnetic stirrer to uniformly disperse the particles at room temperature. One drop of Micro 90 surfactant (Thermo Fisher Scientific) was added to the mixture of the base particles (Glass-Particle-PL2015SL-S2). Drops of the dilute dispersion were spiked into the liquid module port of the analyzer, until 8% obscuration was achieved.

The instrument was then set to run mode. Each run was 60 seconds. Three consecutive runs are done, one minute apart, to assure the obscuration remained constant, and the particles were not dissolving or agglomerating. An equivalent spherical diameter was used to characterize the size distribution of the particles. Particle size measurements were performed over the size range of 0.4 to 2000 microns. Particles outside the measurement range were not included in the reported statistics by the software. Data acquisition and computation of average particle size were done with the software provided by Beckman Coulter LS 13 320 instrument. The D10, D50 and D90 values are defined as the diameter of cumulative distribution curve at 10% point, 50% point and 90% point, respectively. The instrument was checked with NIST Traceable Particle Size Standards (latex standards) for normal operation.

Mercury Porosimetry for Pore Size Distribution and Porosity

Pore size distribution was obtained by mercury porosimetry. The mercury porosimetry analysis was performed on a Micromeritics Autopore IV 9520, available from Micromeritics. The samples were mechanically out-gassed, while under vacuum, prior to analysis, to remove any physically adsorbed species (i.e., moisture) from the surface of the sample.

Test conditions included a Hg fill pressure of 0.50 psia, a Hg contact angle of 130°, a Hg surface tension of 485 dyn/cm, a Hg density 13.53 g/mL, a "30 minute evacuation time," a large bore penetrometer (powder type: 1.131 stem volume) with 5-cc bulb, a "30 seconds equilibration time," a 92-point pressure table (75 intrusion plus 17 extrusion pressure points), and mechanical evacuation<50-μm Hg. The low to high pressure cross over point was collected at approximately 46 psia (3.3 um). The pressure table used was generated to allow an even incremental distribution of pressures, on a log scale, from 0.5 to 60,000 psia, and was used for detecting pore size from 0.003-400-μm diameter. Mercury was forced into smaller and smaller pores as the pressure was increased incrementally, from a vacuum, to a maximum of nearly 60,000 psia. To verify that the instrument was working properly, a Silica-Alumina reference material (Micromeritics lot A-501-46) was analyzed. The reported median pore diameter (volume) of the reference sample was 0.0072±0.0005 μm. The Autopore reported the median pore diameter (volume) of the reference material as 0.0071 μm. Porosity was calculated by excluding the inter particle intrusion, using the data processing software equipped with Micromeritics Autopore IV 9520. The percentage of porosity (% porosity) was calculated as the total volume of the pore (in the range of 0.003 microns to 1.0 microns) divided by the total volume then multiplying by 100. Skeletal density was computed after the volume of all pores, larger than about 0.003 jam, had been excluded from the volume presumed occupied by the material.

Thermogravimetric Analysis (TGA)

TGA was performed using a TA TGA Q5000 V3.17 Build 265. The experimental conditions were: a 10.00° C./min rate, from room temperature to 800.00° C., and a sample weight of 10-30 mg into a 100 microliter platinum pan. The sample was run in air at 25 mL/min air. Graphene does not have appreciable weight loss at a temperature of approximately 2000° C. in an inert atmosphere. In an oxygen containing environment, graphene can be oxidized. About 10% of the graphene weight lost occurs before 650° C., and 90% of the graphene weight lost occurs by 700° C. (Gao et al., Nanoscale Res Lett, 2013, 8:32)). TGA is used to measure the amount of graphene and/or graphene oxide coated on the substrate, by using the weight loss % at temperature of 700° C.

Nitrogen Adsorption/Desorption (B.E.T.)

Nitrogen adsorption/desorption analysis was performed on a Micromeritics Accelerated Surface Area & Porosimetry instrument (ASAP 2405). The samples were out-gassed at 200° C., for approximately 24 hours, while under vacuum, prior to analysis. Approximately 0.5 gram of the "as-received" sample was used for the analysis. Typically, B.E.T. surface areas are measured with a precision of <3% RSD (relative standard deviation. The instrument employs a static (volumetric) method of dosing samples, and measures the quantity of gas (nitrogen) that can be physically adsorbed on a solid at liquid nitrogen temperature. For the multi-point B.E.T. measurement, the volume of nitrogen uptake was measured at pre-selected relative pressure points, at constant temperature. The relative pressure was the ratio of the applied nitrogen pressure to the vapor pressure of nitrogen at the analysis temperature of 77 K. Pore sizes from about 17 to 3,000 Angstroms diameter are detected by this method.

Test conditions for the nitrogen adsorption/desorption isotherms include a 15 second equilibration interval, a 97-point pressure table (40 adsorption points, 40 desorption points, a multi-point B.E.T. surface area, 20 micropore points, and 1-point total pore volume), a 5%/5 mmHg P/Po tolerance, and a 120 min Po interval. The total surface area is defined as B.E.T surface area. The B.E.T. surface area ($m^2/g$) was performed using the data processing software equipped from Micromeritics Accelerated Surface Area & Porosimetry instrument (ASAP 2405).

SEM

Dry powder was sprinkled on aluminum sample stub to which had been adhered a double-sided carbon tape. The prepared specimen was coated with iridium using a EMS 150T plasma coater from "Quorum Technologies" in order to render the particulates conductive under the electron beam. Secondary electron micrographs were acquired using a FEI Nova 600 Schottky field emission secondary electron microscope (SEM). The SEM was operated at 3 kV spot 5, and under a working distance of ~4 mm-6 mm.

EXPERIMENTAL

The base particles used for coating with graphene, and the graphene were purchased, and used without a further purification unless specified See Table 1.

| Amorphous Silica | SC70-2 |
|---|---|

TABLE 1

Information about base materials and graphene nanoplatelets using in coating

| Description | Abbreviation | Manufacturer | Chemical composition* |
|---|---|---|---|
| Solid glass microspheres P2015SL-S2 | Glass-Particle- P2015SL-52 | Cospheric, Santa Barbara, CA, USA | CAS#308076-03-1 Glass oxide (99%), Alkyl trialkylsilane <1% |

TABLE 1-continued

Information about base materials and graphene nanoplatelets using in coating

| Description | Abbreviation | Manufacturer | Chemical composition* |
|---|---|---|---|
| Solid glass microspheres P2015SL | Glass-Particle-P2015SL | Cospheric, Santa Barbara, CA, USA | CAS#308076-03-1 Glass oxide, (100%) |
| Glass Beads 20-27 microns (GL0191B) | Glass Particle-20-27 um | MO-SCI Specialty Products, Rolla, Mo | |
| SPI-Chem Glassy Carbon spherical power 10-20 um | Glassy-Carbon-Particle | Structure Probe, Inc. West Chester, PA | CAS #7440-44-0 (100%) |
| Silicon Carbide 600 Grit | Silicon-Carbide | Beta Diamond Products, Inc. | Silicon Carbide CAS#409-21-2, 97-100% Graphite CAS#7782-42-5, 0-3% |
| Glass Particles GL0191B6 | Glass-Particle-125 microns | MO-SCI Specialty Products, Rolla, Mo | |
| Amorphous non-porous silica | SC70-2 | Nippon Steel & Sumukin Materials Co., Ltd. Micron Coc., Himeji City, Hyogo 671-1124, Japan | $SiO_2$ (≥99.9%) |
| 10581 Nickel powder, spherical, -300 mesh, 99.8% purity | Nickel particle | Alfa Aesar | CAS#7440-02-0 |
| Graphene nano platelets A12 | Graphene | Graphene Supermarket Inc. | |

*Values reported by vendor.

A homopolymer polyethylene (EO-1) with a density of 0.956 g/cm3, melt index ($I_2$) of 1.0, a melt index ratio ($I_{10}/I_2$) of 6.7, a weight average molecular weight (Mw, ethylene equivalent) of 115,000 Daltons, and a polydispersity ($M_w/M_n$) of 2.6; and ethylene-octene copolymers, EO-2, EO-3 and EO-4, with their specified microstructures, are listed in Table 2. A stock solution of EO-1:EO-2:EO-3:EO-4=1:1:1:1 (wt) was prepared in ODCB at a concentration of 4 mg/mL (1 mg/mL, each) at 150.0° C., for 2 hours under stirring. The stock solution was transferred into 10 mL autosampler vials for HT-TGIC analysis. See Table 2.

TABLE 2

Characterization Data for EO-1 to EO-7

| Sample ID* | Density | Melt index I2 | I10/I2 | Mw measured by conventional GPC** | Octene content***, mol % |
|---|---|---|---|---|---|
| EO-1 | 0.957 | 1.0 | 6.7 | 115000 | 0.00 |
| EO-2 | 0.924 | 1.0 | 6.4 | 104500 | 1.33 |
| EO-3 | 0.904 | 1.0 | 6.4 | 102900 | 3.99 |
| EO-4 | 0.865 | 1.0 | 6.9 | 123400 | 13.88 |
| h-PE | 0.957 | 1.0 | | 118,000 | 0.00 |

*Homogeneously branched, substantially linear polymer.
*See a) Metallocene-based polyolefins Volumes One and Two, edited by John Scheirs and Walter Kaminsky, Wiley series in Polymer Science, John Wiley & Sons, Ltd., (2000); and b) Innovations in Industrial and Engineering Chemistry - A Century of Achievements and Prospects for the New Millennium, ACS Symposium Series 1000, edited by William H. Flank, Martin A. Abraham, and Michael A. Matthews, American Chemical Society Copyright 2009; and c) History of Polyolefins, Edited by Raymond B. Seymour and Tai Cheng, D. Reidel Publishing Company, 1986.
**See Hermel, et al., U.S. Pat. No. 8,372,931 and cited references. Weight average molecular weight (Mw) by Conventional GPC referred to the backbone molecular weight of ethylene based polyolefin.
***Octene content measurement was based on Cong et al., Macromolecules 2011, 44, 3062-3072.

Representative Procedure A to Make Inventive Packaging Material by Coating Graphene onto Base Particles The steps in making the inventive substrates by coating graphene onto particles consisted of the following:

1. Weigh 15.0 g of the base particle, such as spherical glass beads, spherical glassy carbon beads or silicon carbide, into a 40 mL glass vial.

2. Weigh the amount of graphene (G) into the vial necessary to give the desired loading, in weight percentage. A nominal 6.25 wt % loading is defined as the amount of graphene divided by total weight of graphene plus base particle, and multiplying by 100%.

3. Mix the two ingredients by shaking and rotating the vial until the mixture has a uniform color. The material is ready for making the columns for HT-TGIC without the rest of steps. The rest of steps can be used to yield more consistent and more easily handled substrates.

4. Add n-hexane, Fisher HPLC grade, to the vial until a small headspace remains, and cap the vial.

5. Place the vial into a sonication bath (Branson model 1510) containing deionized water at room temperature. The level of the water was set according the manufacturer's instruction, but not above the vial cap. It may be necessary to support the vial to prevent it from overturning. The vial sonication time was set to 20 minutes.

6. Pour the sonicated mixture into a glass evaporation dish and allow the hexane to evaporate in an area with proper ventilation. A small amount of hexane was used to rinse the vial, and this rinse was added to the dish.

7. After two hours, there was no visible hexane and the mixture was stirred with a glass rod to break up any remaining clumps, giving a free-flowing, powdery solid of uniform color.

8. The flow powdery solid can be heated in a vacuum oven at 150 C under N2 for 3 hours, then cooled down to room temperature in a dessicator before use.

9. Store the mixture in a clean glass vial with cap. This material is ready to be packed into a column for HT-TGIC analysis.

Representative Procedure B to Make Inventive Packing Material by Coating Graphene onto Metal Particles (1) Metal particles (for example, "10581 Nickel powder") were screened to produce a narrow particle size distribution by particle fractionation techniques, such as sieving. Here, a sieve of a 325 US mesh size was used.

(2) Metal particles in general may have oxides on the surface. Acid cleaning, such as with dilute HCl, was used to clean the oxidized surface. Alternatively, the acid washing and the following coating with graphene can be combined in one step. Here the "sieved nickel" was suspended in about 0.1M aqueous HCl solution for about 2 minutes, the nickel was filtered, and washed with deionized water.

(3) Metal particles were mixed with graphene in methanol. The mixture was stirred for 20 minutes at room temperature. The slurry was filtered and dried under vacuum.

(4) The substrate was packed into a column according the procedure below.

(5) The wt % of graphene coated was calculated as the percentage of the amount of graphene divided by the total weight of metal particles and graphene.

Hardware for Packing Columns

Unless otherwise stated, the standard column configuration consisted of a 0.25 inch outside diameter stainless steel tube, 100 mm in length, and an internal diameter of 4.6 mm, with stainless steel frits of 2 m porosity from Valco. The columns were cleaned with acetone, and dried in air, before being packed with the inventive materials and comparative particles specified in Table 3. An Agilent 1200 Liquid Chromatography Pump was used for the slurry packing method. A packing reservoir was constructed of 4.6 mm internal diameter stainless steel tubing with Valco end fittings. The reservoir was 100 mm in length. A Valco ¼ inch union allowing butt to butt connections between the analytical and the packing reservoir was used to connect the two lengths of tubing.

Methodologies for Packing Columns

The columns for use in high temperature solvent gradient, thermal gradient interaction chromatography (HT-TGIC, or simply TGIC), and HT-GPC had the following properties:

1. Packed columns exhibit good mass transfer properties including low back pressure, 100 bar or less, at standard operating conditions of flow and temperature, low sensitivity to shock from abruptly changing conditions, and lack of channels and void spaces.

2. Packed columns which were long enough to permit studies of the effect of dynamic cooling on component resolution. The dynamic cooling is a process of using a slow flow during the cooling process to further enhance HT-TGIC separation (Cong et al., Macromolecules, 2011, 44(8), 3062-3072).

The empty column was suspended vertically. Substrate was added in small increments through a funnel, while the column was tapped or vibrated to settle the substrate. When the substrate is level with the end of the column, the packing reservoir was connected. The substrate was added to the reservoir in the same manner, until the reservoir was also filled. The reservoir and column with end fitting was then assembled, and connected to the Agilent pump. The 1,2,4-trichlorobenzene (TCB) was pumped at a flow of 2-5 mL/min, through the reservoir until air was displaced from the column. TCB was pumped at 2-5 mL/min through the column for at least twenty minutes, or until the system pressure reaches 2500 PSIG. The column was disconnected from the packing reservoir, and any excess packing at the end of the column was removed with a flat blade scraper to provide an even surface level with the end of the tubing. The end fitting with frit was tightened into place, and the column was ready for conditioning.

TABLE 3

Properties of the Packing Materials

| | Base particle | wt % of Graphene used.** | wt % of Graphene measured by TGA.** | Size of the base particle (microns) uncoated | | | | | % Porosity of base particle in the pore size range 0.003 to 1.0 microns |
|---|---|---|---|---|---|---|---|---|---|
| | | | | D10 | D50 | D90 | 3D50 | 4D50 | |
| Comp. Ex. #1 | Porous Graphite | N/A | N/A | 7* | 7* | 7* | 21 | 28 | 38.1 |
| Inv. Ex. #1: Glass-Particle-PL2015 Coated-7 wt %-Graphene | Glass Particle_P2015SL (spherical) | 7.0% | 6.7% | 1.2 | 6.5 | 11.7 | 19.5 | 26 | 2.9 |
| Inv. Ex. #2: Glass-Particle-PL2015-S2 Coated-5.0 wt %-Graphene) | Glass Particle-P2015SL-S2 (spherical) | 5% | | 1.0 | 3.5 | 9.1 | 10.5 | 14.0 | 1.0 |
| Inv. Ex. #3 (Glassy Carbon coated with 6.25% Graphene) | Glassy Carbon (spherical) | 6.25% | 99.1% | | | | | | 0.1 |
| Inv. Ex. #4: Silican-Carbide-Coated-5.1 wt %-Graphene) | Silicon Carbide 600 Grit (rod-shaped) | 5.1% | 3.4% | 2.3 | 4.3 | 6.6 | 12.9 | 17.2 | 0.7 |
| Inv. Ex. #5: Glass-Particle-125 microns-Coated-3 wt % Graphene | Glass-Particle-125 microns (spherical) | 3.0% | | 0.0 | 129.0 | 135.6 | 387.0 | 516.0 | |

TABLE 3-continued

Properties of the Packing Materials

| | Base particle | wt % of Graphene used.** | wt % of Graphene measured by TGA.** | Size of the base particle (microns) uncoated | | | | | % Porosity of base particle in the pore size range 0.003 to 1.0 microns |
|---|---|---|---|---|---|---|---|---|---|
| | | | | D10 | D50 | D90 | 3D50 | 4D50 | |
| Inv. Ex. #6: Nickel-Particle-Coated-3 wt % Graphene | Nickel particle (spherical) | 3.0% | | | | | | | |

*According to Manufacturer.
**based on weight of particle and graphene.
N/A = not applicable.

Inventive Example #1—Glass-Particle-PL2015-Coated-7.0 wt %-Graphene

The Inventive Example #1 (Glass-Particle-PL2015-Coated-7 wt %-Graphene) was made by mixing 15.0 g of Glass-Particle-PL2015 with 1.13 g of Graphene in a 40 mL glass vial. The amount of graphene was to sufficient to cover all of the surface area of the base particles. The Glass-Particle-PL2015 had an average particle size of D10, D50 and D90 at 1.2 microns, 6.5 microns, 11.7 microns, respectively, and a very low porosity at 2.5% (Table 3). The vial was shaken by hand, until the mixture had a uniform color. Next, 30 mL n-hexane (Fisher HPLC grade) was added to the vial to displace air and to cover the surface of the mixture. The vial was capped. The vial was then placed into a sonication bath (Branson model 1510) containing deionized water, at room temperature. The level of the water was set according to the manufacturer's instruction, but not above the vial cap. It may be necessary to support the vial to prevent it from overturning. The vial sonication time was set to 20 minutes. The sonicated mixture was poured into a glass evaporation dish, to allow the hexane to evaporate in an area with proper ventilation. A small amount of hexane was used to rinse the vial, and the rinse was added to the dish. The dried power was obtained as the inventive example #1. The properties of the Inventive Example #1 are listed in Table 3.

Figure 2:
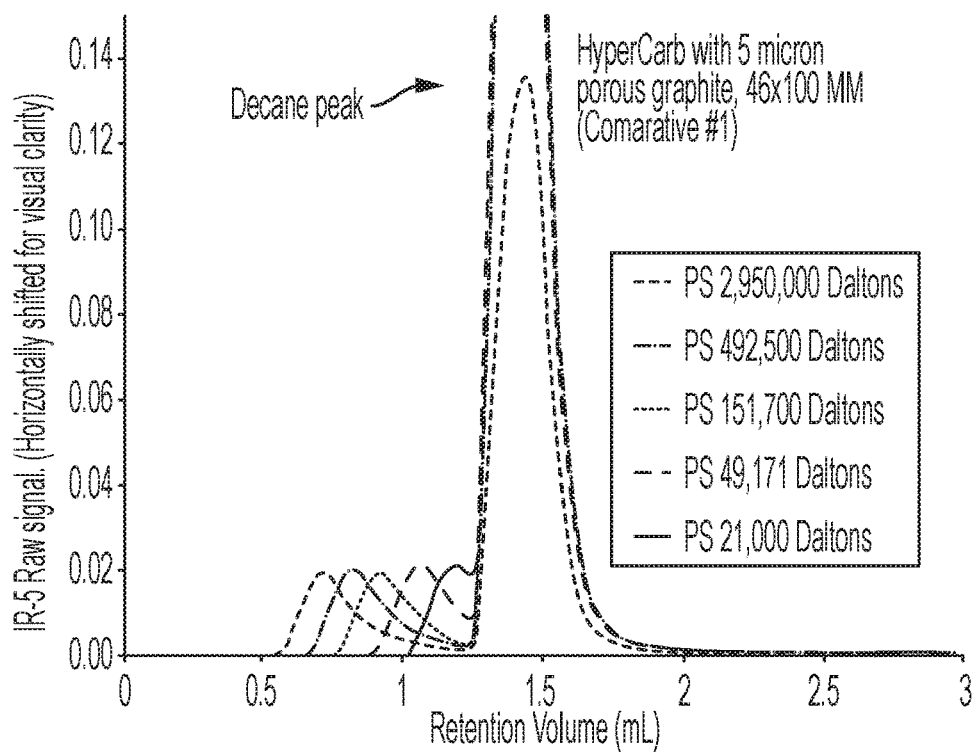
FIG. 2 depicts SEC effect with the comparative packing material (porous graphite) by using polystyrene standards.
Figure 3:
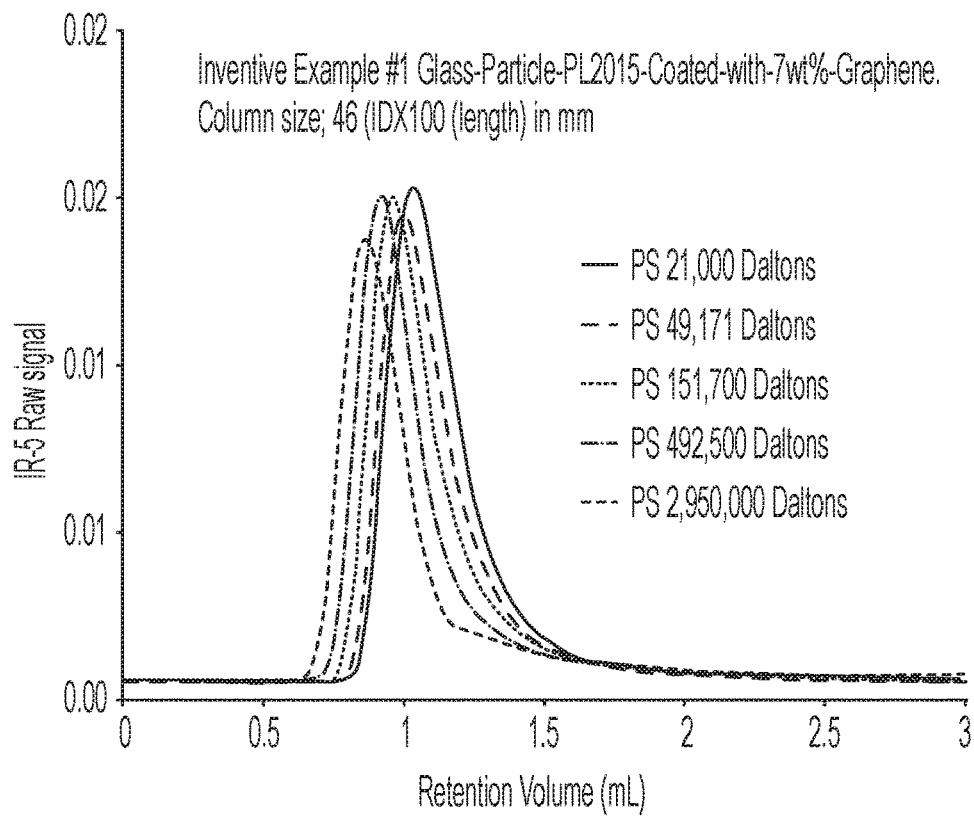
FIG. 3 depicts significantly reduced SEC effect with the inventive packing material (Glass-Particle-PL2015-Coated with 7 wt % graphene) by using polystyrene standards.

A reduced SEC effect of the Inventive Example #1 was characterized by its ability to separate PS standards in ODCB at a constant temperature. The commercial HYPERCARB column, packed with porous graphite, is well known for its superior SEC effect (Cong, et al., Size exclusion chromatography of polymers WO 2012166861 A1). As shown in FIG. 2, the graphitic HYPERCARB column was well capable of separating PS in the molecular weight range of 2,950,000 Daltons to 3250 Daltons. PS at 2,950,000 Daltons eluted first, followed by PS with 492,500 Daltons, followed by 151,700 Daltons, followed by 49,171 Daltons, and lastly by PS at 21,000 Daltons. The large peak, at retention volume of 1.5 mL, was from decane, which was used as flow marker. In contrast, much less separation in these polystyrene standards were achieved by the Inventive Example #1 (FIG. 3). Decane was not added into PS standard, because of the poor SEC effect; the PS peak overlapped with decane peak for the Inventive Examples.

Figure 4:
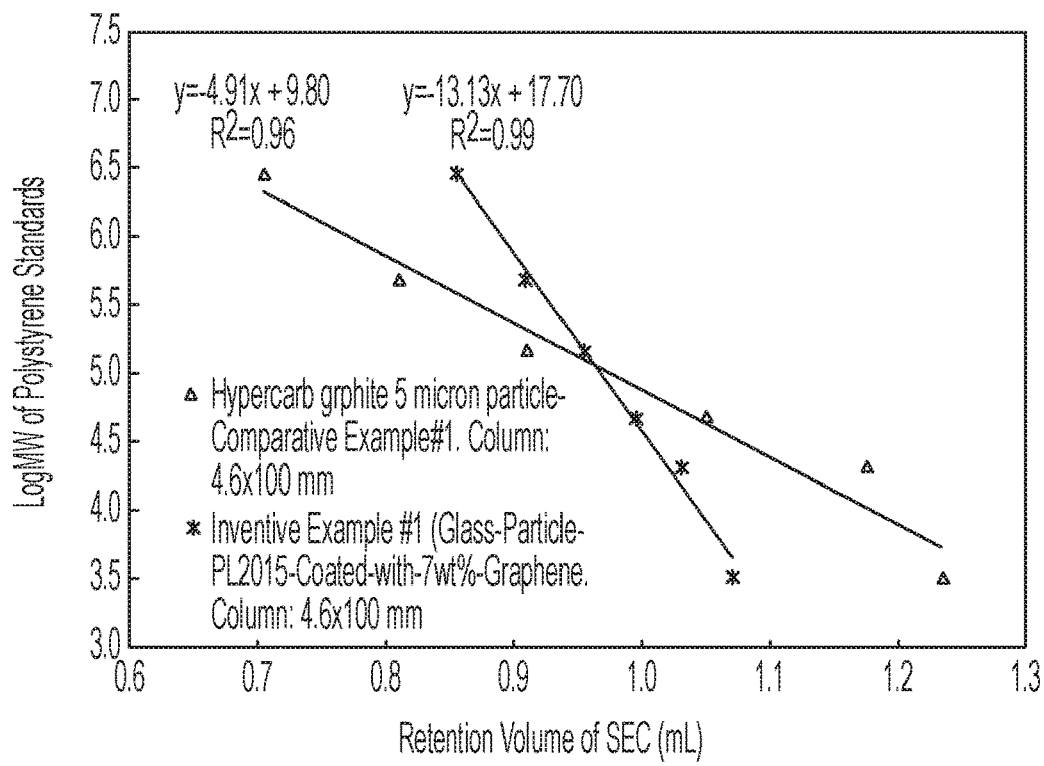
FIG. 4 compares the correlation of SEC retention volume versus log MW of PS obtained with the inventive packing material #1(Glass-Particle-PL2015-Coated with 7 wt % graphene) and the comparative packing material #1 (porous graphite).

Retention volume is plotted against "$\log_{10}$ MW" of PS standards. The steeper the slope, the less the SEC effect achieved. As shown in FIG. 4, the comparative #1 HYPERCARB graphite column had a slope of −4.91, while the Inventive Example #1 had a much steeper slope of −13.13. The Inventive Example #1 had a much less "SEC effect" than the Comparative Example #1, and this led to a better HT-TGIC separation and simplified separation mechanism in HT-TGIC with the Inventive Example #1.

Figure 5:
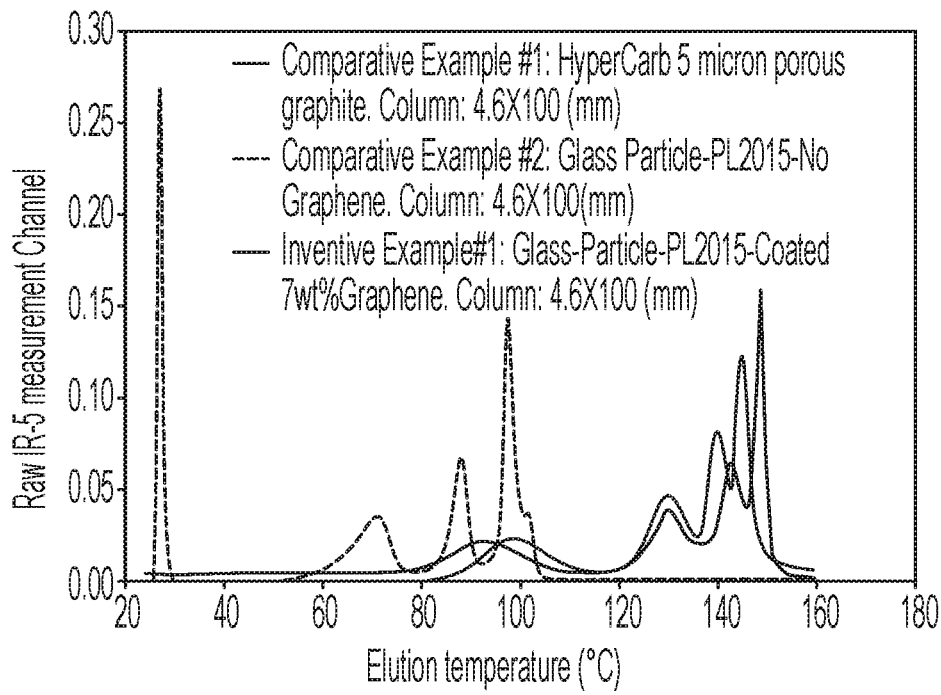
FIG. 5 depicts the chromatograms of Blend 4 by using the comparative packing material #1 (porous graphite), the comparative packing material #2 (glass particle PL-2015 without graphene) and the inventive packing material #1 (Glass-Particle-PL2015-Coated with 7 wt % graphene).

The HT-TGIC (see above test method) separates ethylene-α-olefin copolymers based on the comonomer content, from zero comonomer content up to approx. 50 mol % comonomer (Cong et al., Macromolecules, 2011, 44, 3062-3072; Monabal., Adv Polym Sci, 2013, 257: 203). FIG. 5 shows the HT-TGIC chromatogram overlay of the Inventive Example #1, the Comparative Example #1(HYPERCARB graphite column at 5 micron particle size), and the Comparative Example #2 (Glass-Particle-PL2015 with zero graphene). Comparative Example #1 is the state-of-art column for interaction chromatography of polyolefins. As shown in FIG. 5, the HYPERCARB column was capable of separating all of the four components in the Blend 4 mixture, and the amorphous material EO-4, containing 13 mol % octene, eluted around 95° C. This is a well-known advantage of interaction chromatography in SCBD analysis for polyolefin, where a crystallization based technique is unable to separate polyethylene containing more than 8 mol % of comonomer. Bare glass particles of PL2015 are a common substrate for crystallization based technology (Monrabal, Macromol. Symp. 356, 147; Hermel-Davidock et al., U.S. Pat. No. 8,372,931)), and behave in the TREF mode; the eluting peak temperature of EO-1 was below 97.4° C. On the contrary, coating 7 wt % of graphene onto glass particle PL 2015, significantly changes the elution profile. The elution temperature of Blend 4, using the Inventive Example #1, was much higher than the Comparative Example #2 (crystallization based technique). It was very similar to HYPERCARB, because interaction chromatography is the primary mode of separation. In addition, the peak shape of the Blend 4, obtained with the Inventive Example #1, was much sharper and symmetrical than those obtained by Comparative Example #1, which elution was confounded by the more pronounced SEC effect in the Comparative Example #1. This is due to the substantially low porosity of the base particle, or basically nonporous base particle, and the homogeneous interaction sites of graphene coated on very low porosity glass particles for the adsorption of polyolefin chains.

Figure 6:
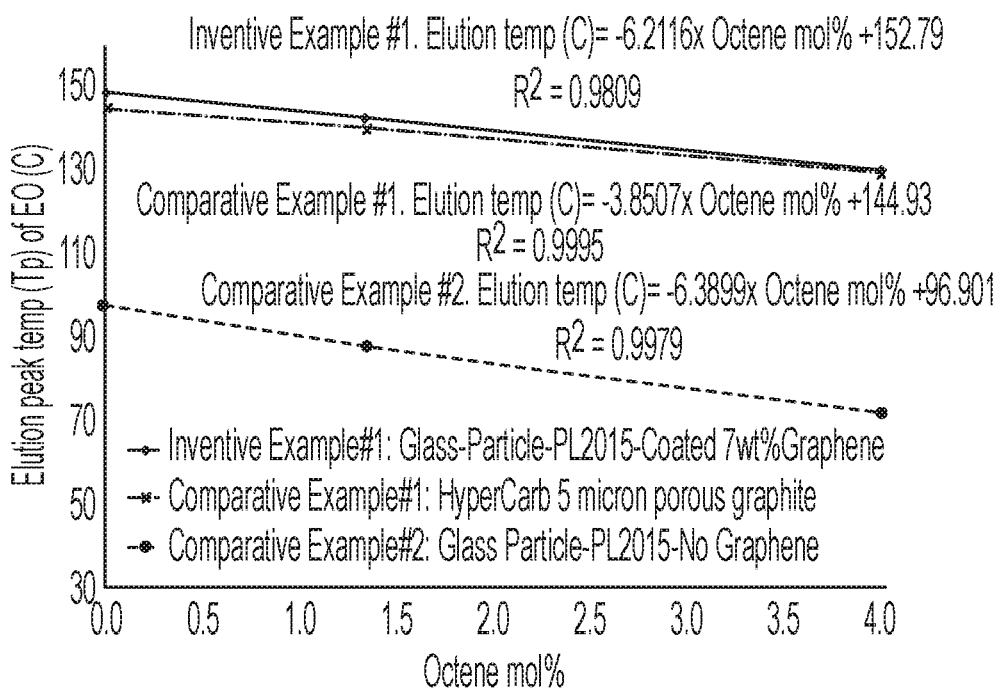
FIG. 6 depicts the correlation of "octene (mol %) vs elution temperature," by using the comparative substrate #1 (porous graphite), the comparative packing material #2 (glass particle PL-2015 without graphene) and the inventive packing material #1 (Glass-Particle-PL2015-Coated with 7 wt % graphene).

The Inventive Example #1 has a much improved resolution (R) as the substrate for High Temperature Thermal Gradient Interaction Chromatography (HT-TGIC) than that of porous graphite HYPERCARB (Comparative #1). The resolution R is defined as the difference in the peak temperature between EO1 and EO1 divided by the sum of the half width of EO1 and EO2. The higher R is, the better the resolution. Resolution of the inventive example=(148.73 C−142.78 C)/{(149.655 C− 147.45 C)+(145.85 C−140.13 C)}=0.75, while R of the Comparative #1 was calculated as (144.99 C−139.79 C)/{(146.49 C−143.04 C)+(142.70 C−137.53 C)}=0.60. In other word, there was 25% increase in the resolution by using the Inventive Example #1 in HT-TGIC. The plot of elution peak temperature of EO-1, EO-2 and EO-3 versus octene mole % is shown in FIG. 6. The inventive Example #1 yielded a slope of (−6.21) while the Comparative Example #1 (HYPERCARB for HT-TGIC) was (−3.85), which was less steep, indicating that the Inventive Example #1 gave much higher resolution than the comparative HYPERCARB column. The improved Separation (IS) is defined as the percentage of the change in the slope in elution temperature versus octene content. The correlation of peak temperature versus octene mol % is obtained using same HT-TGIC method specified in the experimental section with a column of "100×4.6 mm." The "IS" is [(−6.21)−(−3.85)/(−3.85)]*100%=236%. The Comparative #2 (Base glass particles) worked as crystallization mode, thus had a much lower elution temperature than the Inventive #1 (HT-TGIC mode) and the Comparative #1 (HT-TGIC mode), and was thus unable to fractionate ethylene based polyolefins with a high comonomer content.

In summary, it has been discovered that the inventive packing material significantly reduced the SEC effect (see above test methods), due to the decreased porosity of the base particles, when compared with current state-of-art HYPERCARB column; provided an equivalent separation to that of crystallization based techniques for EO polymer with octene content less than 7 mol %; and also covered a much wider range of comonomer content than crystallization based techniques.

Inventive Example
2—GlassParticle-PL2015SL-S2-Coated-7 Wt %
Graphene

The Inventive Example #2 (Glass-Particle-PL2015SL-S2-Coated-7 wt %-Graphene) is made the same procedure as the Inventive Example #1, except base particle was Glass-Particle-PL2015-S2. The properties of the Inventive Example #2 are listed in Table 3. Similar as with Glass-Particle-PL2015, used in the Inventive Example #1, Glass-Particle-PL2015-S2 is basically non-porous. See above HT-TGIC test method.

Figure 7:
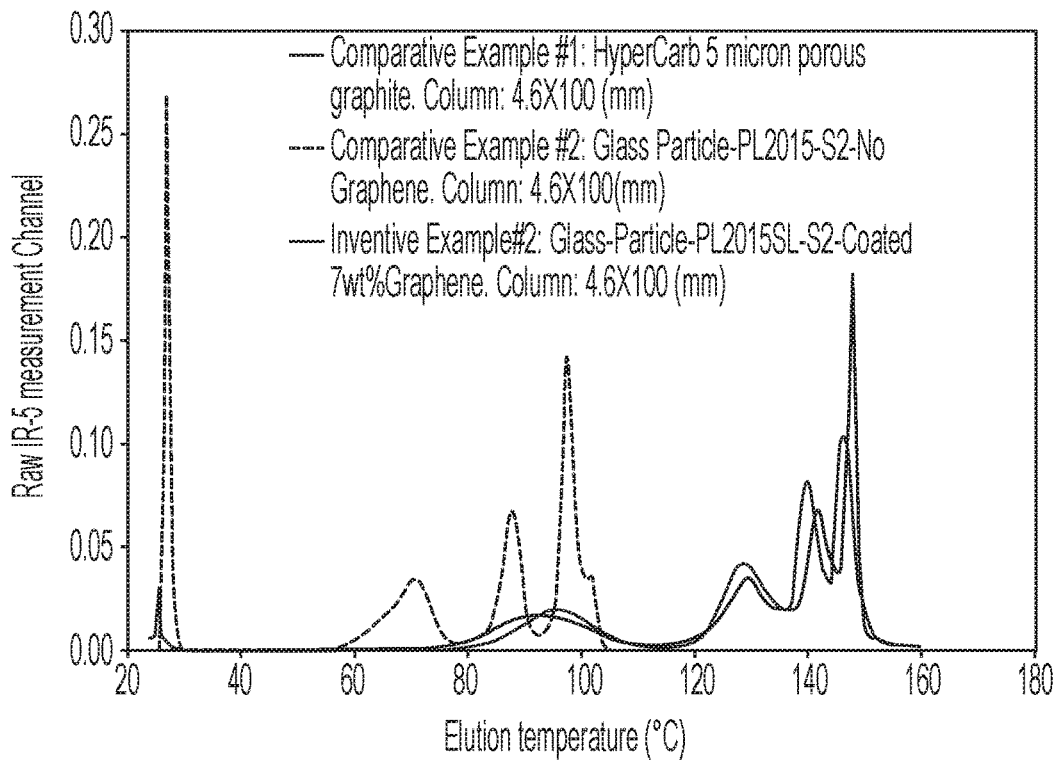
FIG. 7 depicts the chromatograms of Blend 4 by using the comparative packing material #1 (porous graphite), the comparative packing material #2 (glass particle PL-2015 S2 without graphene coating) and the inventive packing material #2 (Silanized Glass-Particle-PL2015-S2-Coated with 7 wt % graphene).

FIG. 7 shows the HT-TGIC chromatogram overlay of Blend 4 obtained by the Inventive Example #2, Comparative Example #1 and Comparative Example #2. The elution temperature of Blend 4 with the Inventive Example #2 was much higher than the Comparative Example #2 (crystallization based technique), but very similar to the Comparative Example #1(interaction chromatography). In addition, the peak shape of the Blend 4, obtained with the Inventive Example #2, is much sharper than that obtained by Comparative column #1. This is due to the substantially low porosity of the base particle, and the homogeneous interaction site of graphene, which was coated on the basically non-porous base glass particle for adsorption of the ethylene-based polymer chains.

Inventive Example #3—Glassy-Carbon-Coated
6.3% Graphene (Blend 4 was at 3 Mg/mL)

The Inventive Example #3 (Glassy-Carbon-Particle-Coated-6.3 wt %-Graphene) is made in the same manner as the Inventive Example #1, except that the base particle used glassy carbon particles, instead of glass particles, and the amount of graphene was different. Glassy carbon made by SPI is a "non-graphitizing or non-graphitizable carbon, which combines glassy and ceramic properties with those of graphite. Unlike graphite, glassy carbon has a fullerene-related microstructure and has no porosity". (http://www.2spi.com/category/labware-crucibles-glassy-carbon/). See above HT-TGIC test method. The properties of the Inventive Example #3 is listed in Table 3. Similar to Glass-Particle-PL2015, used in the Inventive Example #1, glassy carbon is basically non-porous.

Figure 8:
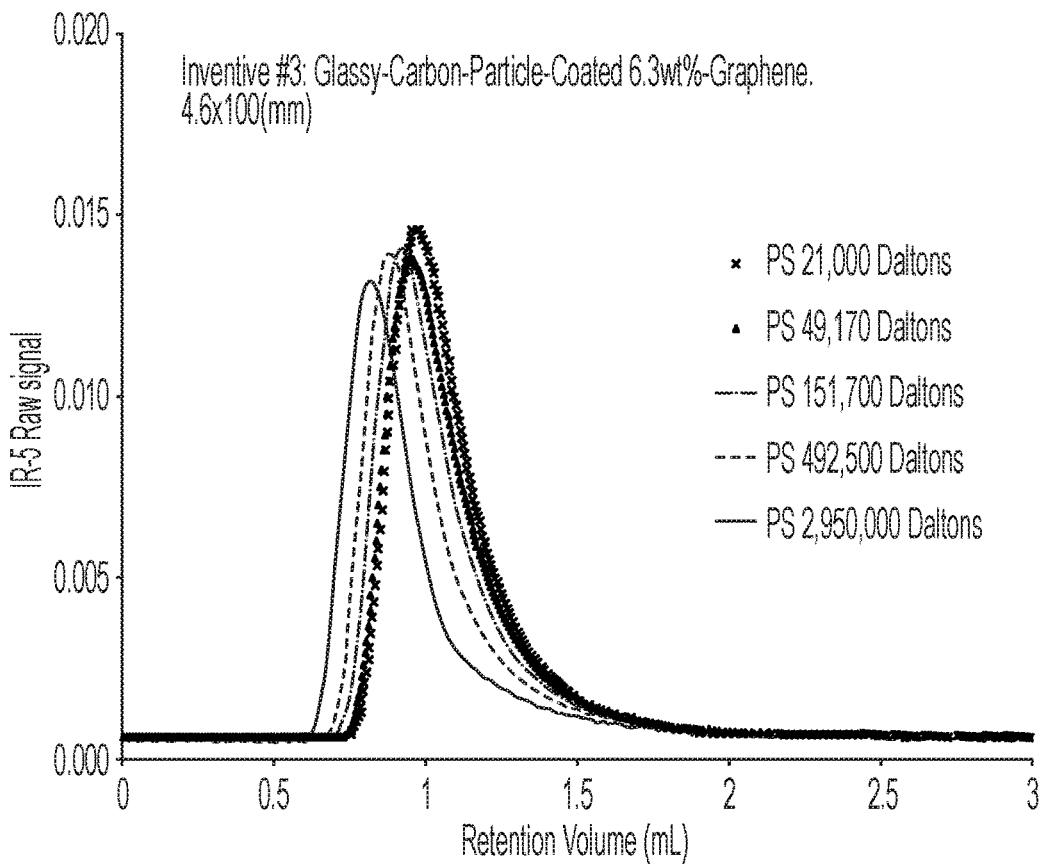
FIG. 8 depicts significantly reduced SEC effect with the inventive packing material #3 (Glass-Carbon-Particle-Coated with 6.3 wt % graphene) by using different molecular weight polystyrene standards.
Figure 9:
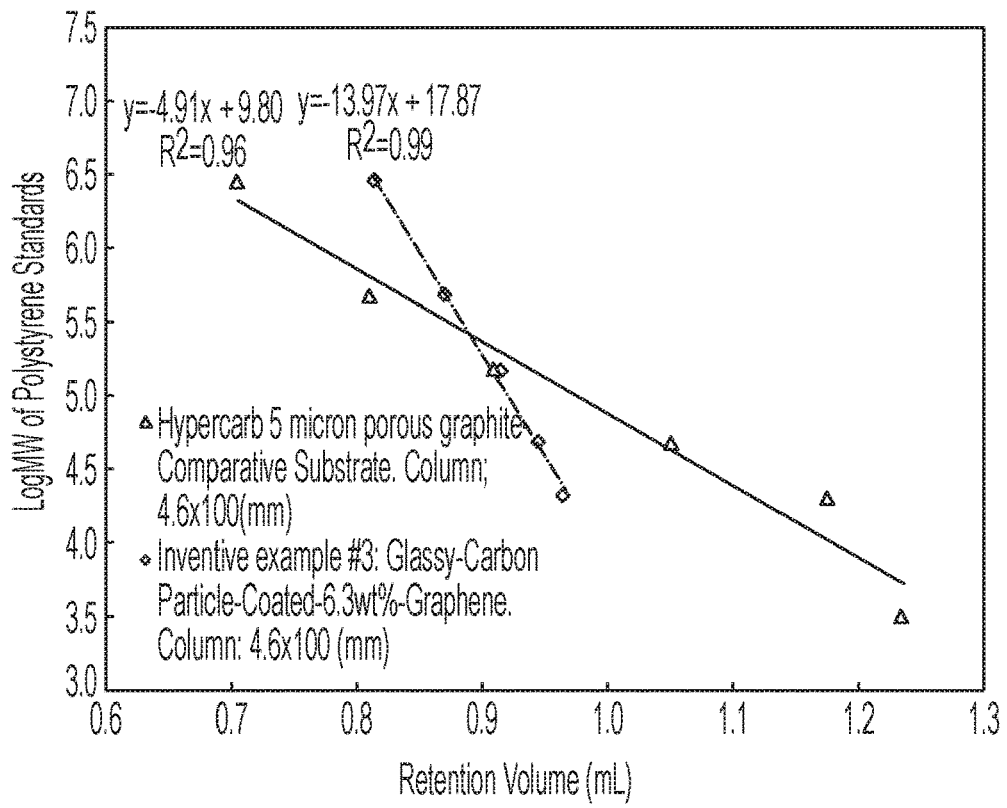
FIG. 9 compares the correlation of SEC retention volume versus log MW of PS obtained with inventive packing material (Glassy-carbon-particle-coated with 6.3 wt % graphene) and the comparative packing material (porous graphite).

A reduced SEC effect of the Inventive Example #3 was seen in FIG. 8. In contrast to the Comparative Example #1 (HYPERCARB column, FIG. 2), much less separation in these polystyrene standards were achieved by the Inventive Example #3 (FIG. 9). Decane was not added to the PS standards, because of the poor SEC effect. Retention volume was plotted against $\log_{10}$ MW. As shown in FIG. 9, the Comparative #1 HYPERCARB graphite column has a slope of −4.91, while the Inventive Example #3 had a much steeper slope of −13.97. In conclusion, the Inventive Example #3 had a much reduced SEC than the Comparative Example #1.

Figure 10:
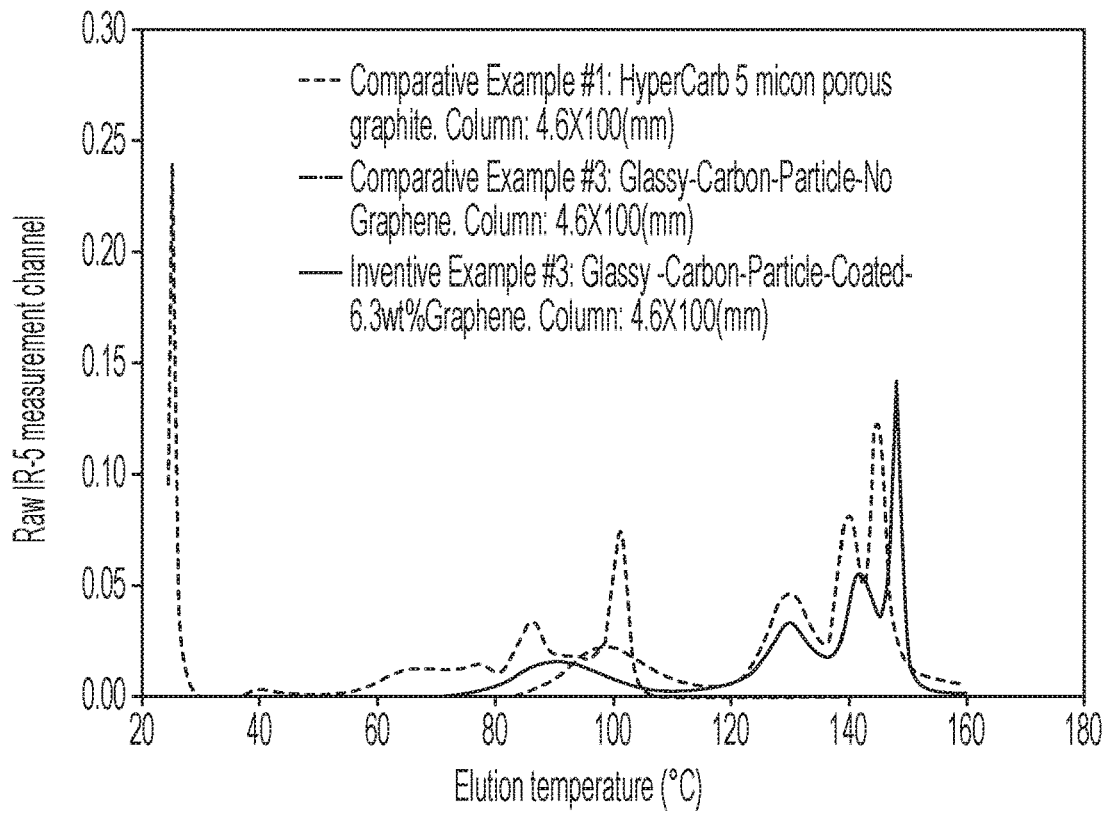
FIG. 10 depicts the chromatograms of Blend 4 by using the comparative packing material #1 (porous graphite), the comparative substrate #3 (Glassy-carbon-particle without graphene coating) and the inventive substrate #3 (Glassy-carbon-particle-coated with 6.3 wt % graphene).

FIG. 10 shows the chromatogram overlay of Blend 4, obtained with the Inventive Example #3, and the Comparative Example #1(HYPERCARB graphite column at 5 micron particle size), and Comparative Example #3 (Glassy carbon particle with zero graphene). Glassy Carbon Particle, with zero graphene, behaved as a TREF separation; the eluting peak temperature of EO-1 was below 97.5° C.; there were some extra shoulders showing up between 30° C. to 97.5° C. On the contrary, coating 6.3 wt % of graphene onto glassy-carbon-particles significantly changed the elution profile. The elution temperature of Blend 4 with the Inventive Example #3 was much higher than the Comparative Example #3 (crystallization based technique). Inventive Example #3 separated the ethylene based polymers using interaction chromatography. In addition, the peaks of the Blend 4, obtained with the Inventive Example #2, were much sharper than that obtained by Comparative Example #1. This is due to the substantially low porosity of the base particle, and the homogeneous interaction site of graphene, which was coated on the basically non-porous base glass particle for adsorption of the ethylene-based polymer chains.

Inventive Example #4—Silicon-Carbide-Coated 5.0
wt % Graphene

The Inventive Example #4 (Silicon-Carbide-Coated-5.0 wt %-Graphene) was made in the same manner as the Inventive Example #1, except that base particle used silicon carbide particles instead of glass particles, and the level of graphene dosage was lower, due to the higher density of silicon carbide compared to glass. The properties of the inventive example #4 are listed in Table 3. Similar to other base particles, the silicon carbide particle is basically non-porous. See above HT-TGIC test method.

Figure 11:
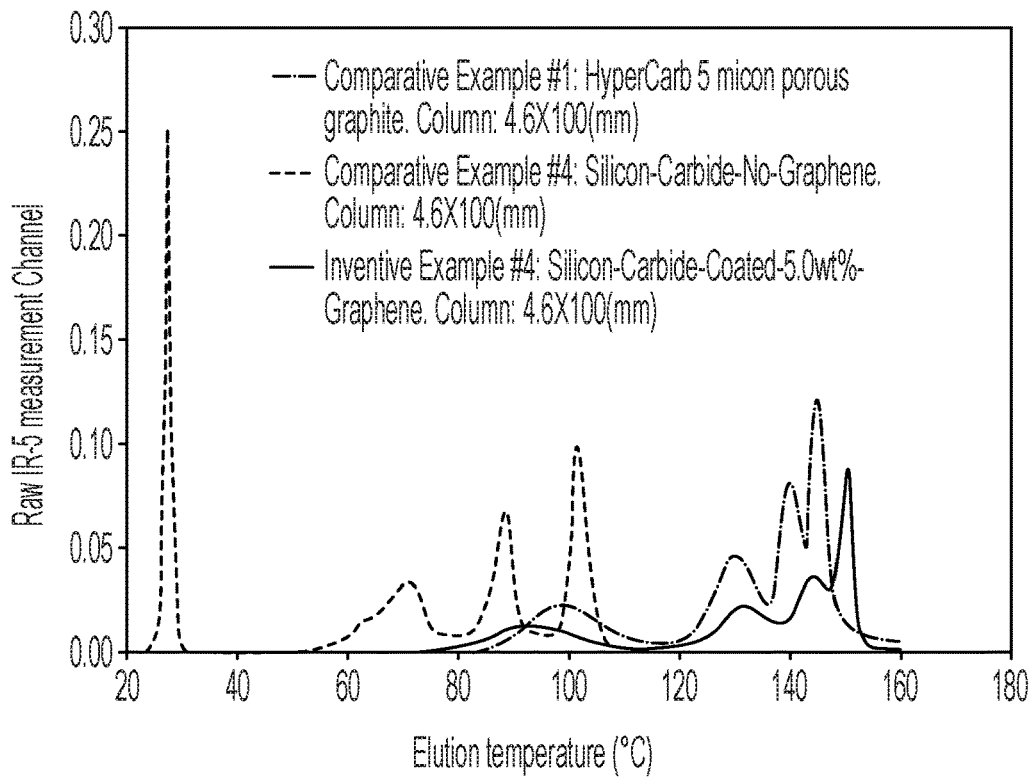
FIG. 11 depicts the chromatograms of Blend 4 by using the comparative substrate #1 (porous graphite), the comparative packing material #4 (Silicon carbide without graphene coating) and the inventive substrate #4 (Silicon-Carbide-coated with 5.0 wt % graphene).

FIG. 11 shows the HT-TGIC chromatogram overlay of the Inventive Example #4, the Comparative Example #1 (HYPERCARB graphite column at 5 micron particle size), and Comparative Example #4 (silicon carbide with zero graphene). Bare silicon carbide was reported to have a weak HT-TGIC effect (Cong et al., EP 2 714 226 B1), eluting at 101.5° C. which was approx. 5° C. higher than that of glass particles of crystallization based techniques. Coating of 5.0 wt % of graphene onto glassy-carbon-particle, significantly changed the elution profile of the Blend 4. The elution temperatures of Blend 4 components in the Inventive Example #4 were much higher than the Comparative Example #4 (crystallization based technique), but very similar to those obtained by HYPERCARB, which is interaction chromatography. In addition, the peak shape of the Blend 4 obtained with the Inventive Example #4 was much sharper with much better resolution, than that obtained by Comparative Example #1. This is due to the substantially low porosity of the base particle, and the homogeneous interaction site of graphene, which was coated on the basically non-porous base glass particle for adsorption of the ethylene-based polymer chains. It was discovered that the adhesion between graphene and the base particle was strong enough that shredding of the particles was not observed, which would be detected by online light scattering detector. The chromatographic stability was very uniform over the time.

Inventive Example #5—Glass-Particle-125 Microns-Coated 3.0 wt % Graphene (Column Size 4.6 (ID)×150 (Length) (Mm)

Figure 12:
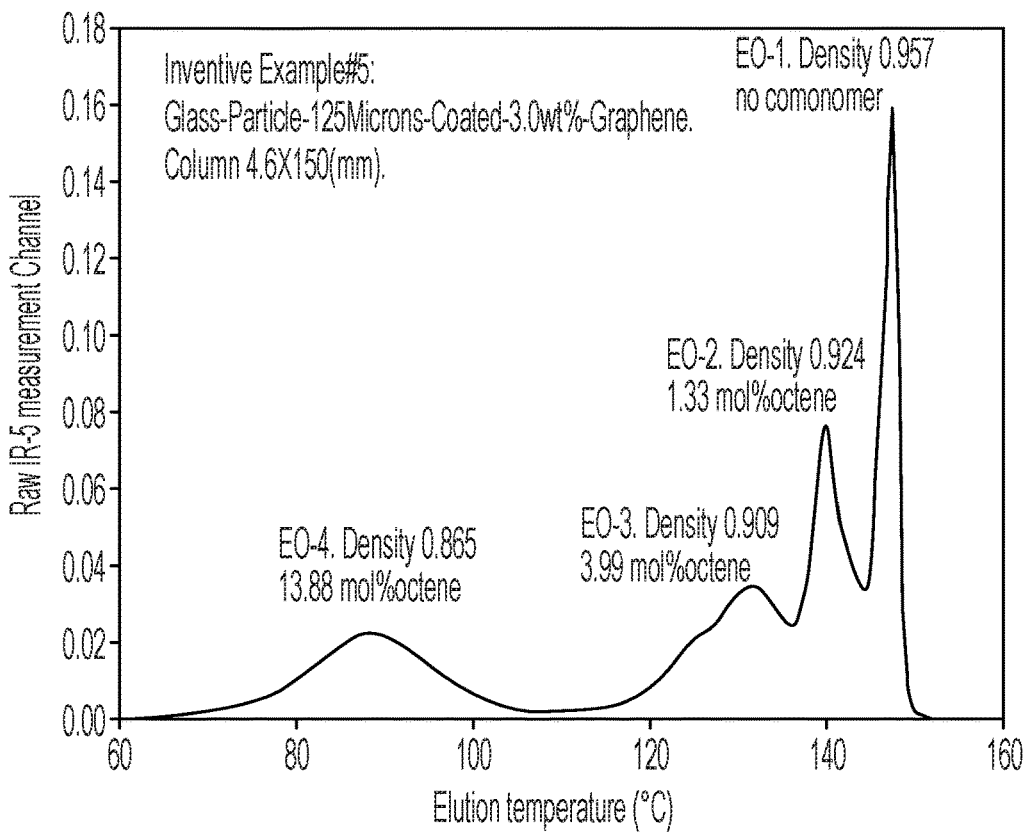
FIG. 12 depicts a SCBD separation of Blend 4 using the inventive packing material #5 (Glass-particle-125 microns-coated with 3.0 wt % graphene).

The Inventive Example #5 used substantially nonporous glass particles of 125 microns as the base particle, which were coated with 3.0 wt % graphene, using coating steps 1-3 (see above coating procedure A). The inventive packing material was packed into 150×4.6 (L×D) column. FIG. 12 shows the HT-TGIC chromatogram of Blend 4. EO-4, at 13.88 mol % octene, eluted at 87° C., which proved that the Inventive Example #5 separated ethylene based polymers using interaction based mechanism. The order of elution was inversely correlated to the octene content, or proportional to the density of the EO polymer. See above HT-TGIC test method.

Inventive Example #6—Nickel-Particle-Coated 2.0 wt % Graphene (Column Size 4.6 (ID)×150 (Length) (Mm)

Figure 13:
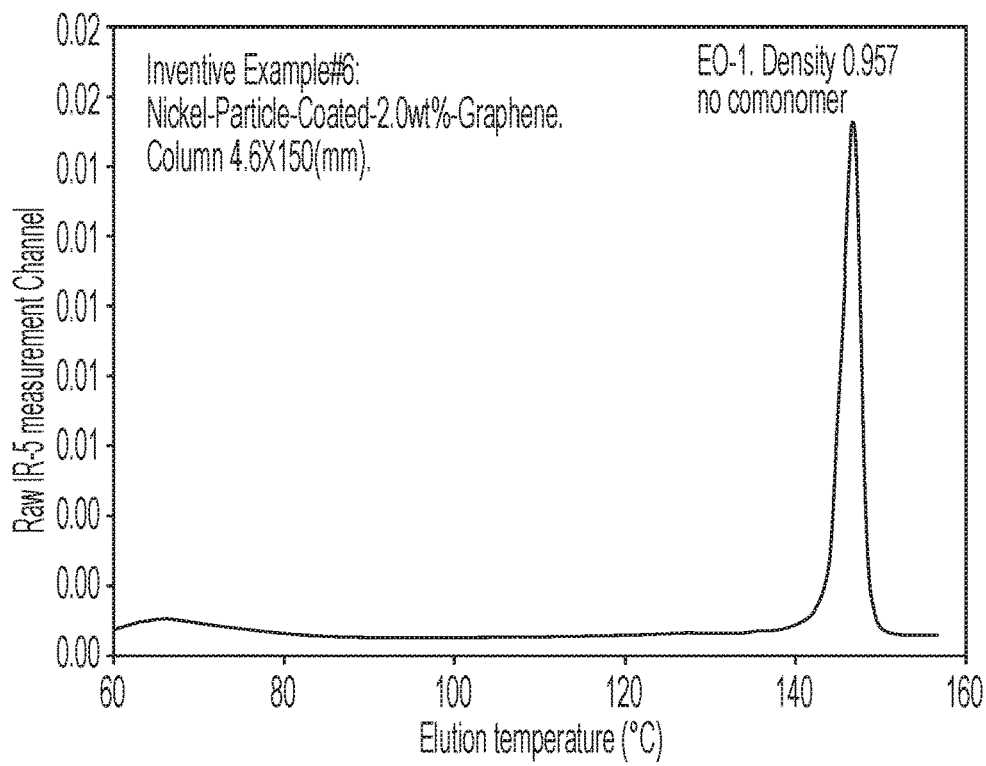
FIG. 13 depicts HT-TGIC chromatogram of EO-1 by using the inventive packing material #6 (Nickel-particle-coated with 2.0 wt % graphene).

The Inventive Example #6 used nonporous nickel particles of 44 microns, as the base particle, and these particles were coated with 2.0 wt % Graphene, using the coating procedure for metal particles (see above coating procedure B). The inventive packing material was packed into "150× 4.6 mm (L×D) column." FIG. 13 shows the HT-TGIC chromatogram of EO-1 eluting at 146° C., which proved that the Inventive Example #6 separated ethylene-based polymers by HT-TGIC separation mode. See above HT-TGIC test method.

Figure 14:
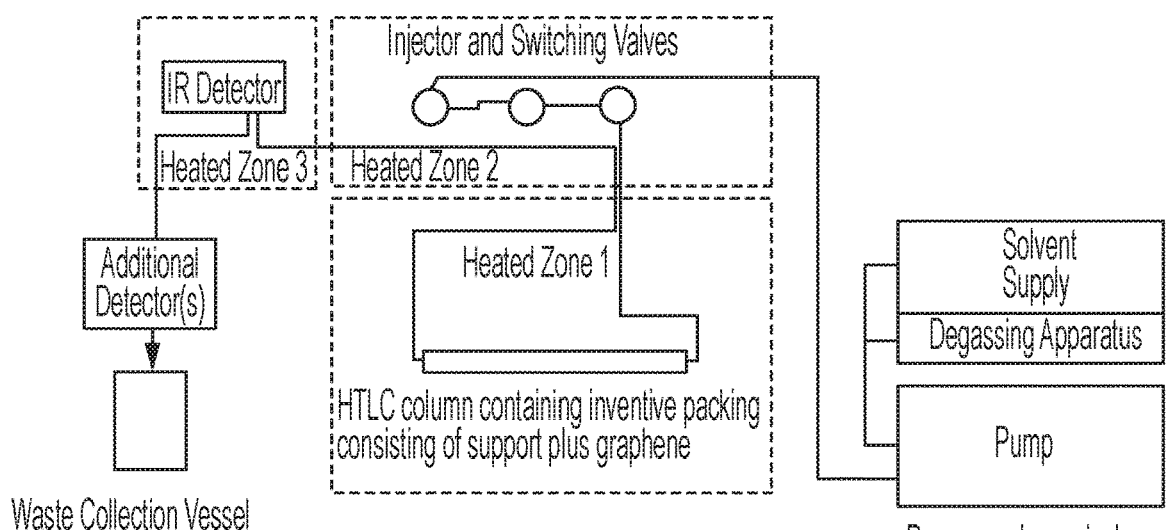
FIG. 14 depicts a schematic of an inventive chromatography apparatus.
Figure 15:
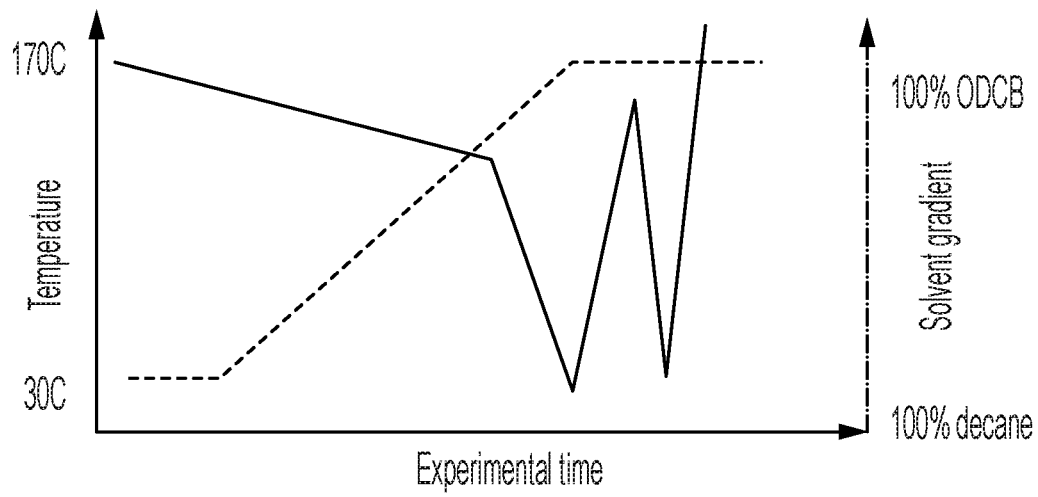
FIG. 15 depicts a temperature profile and a solvent profile for a simultaneous temperature gradient and solvent gradient. The solid line represents the thermal gradient. The dotted line represents the solvent gradient.

An example of an inventive apparatus is shown in FIG. 14. As seen in this figure, the inventive packing material is used in an HTLC column. The packing material can be subject to a temperature gradient and a solvent gradient. Simultaneously applying a solvent gradient and a temperature gradient can lead to a further improved resolution, and/or reduced analysis time, and/or better separation. FIG. 15 depicts a temperature profile and a solvent profile for the simultaneous application of a temperature gradient and a solvent gradient to the inventive packing material. The solid line represents the thermal gradient. The dotted line represents the solvent gradient.

Inventive Example #7—"Fractionated SC70-2 Silica"-Coated 5.0 wt % Graphene (Column Size 4.6 (ID)×250 (Length) (Mm) for Ethylene Polar Copolymer Resin Other than Ethylene Alph-Olefin Copolymers Amorphous silica SC70-2 was purified by multiple cycles of sedimentation in distilled water to remove the particles with a diameter larger than 30 micron and less than 5 microns. The particle size was measured by SEM. The purified SC70-2 is herein defined as "Fractionated SC70-2 silica". The purified SC70-2 was coated with 5.0% graphene A12 according to method A of coating procedure.

Figure 16:
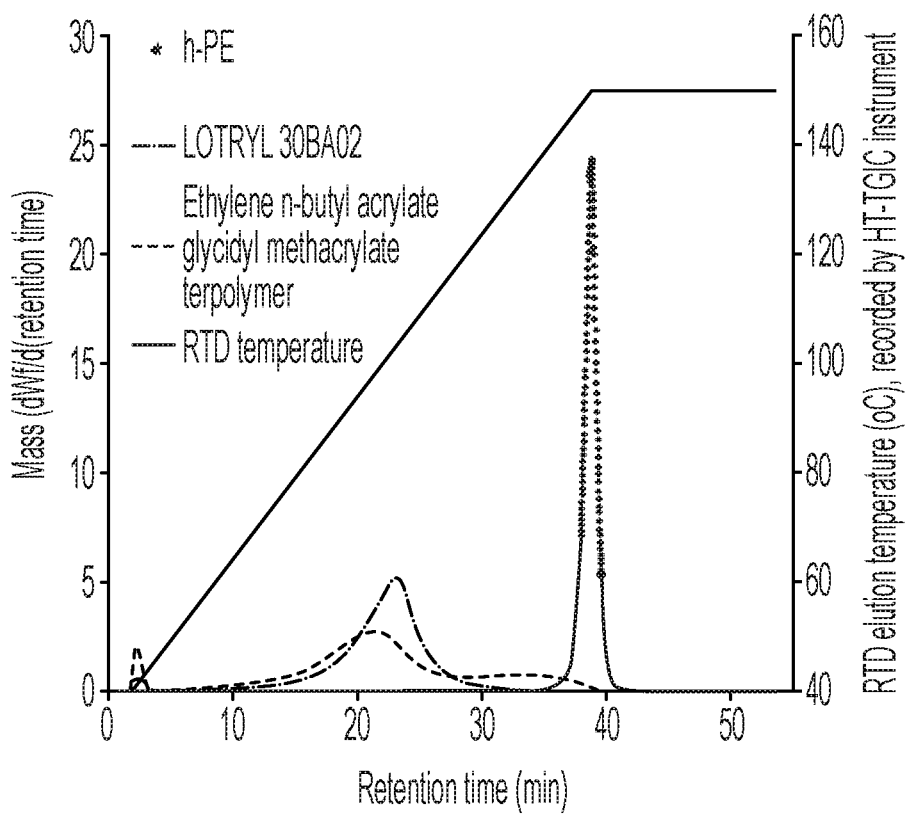
FIG. 16 depicts HT-TGIC chromatograms of ethylene-n-butyl acrylate copolymer, ethylene/n-butyl acrylate/glycidyl methacrylate terpolymer a using the inventive packing material (Fractionated SC70-2 silica-coated with 5.0% graphene). Column size: 250 (length)×4.6 (ID) (mm), the cooling from 150° C. to 30° C. at 3° C./min, flow rate during cooling 0.02 mL/min, heating rate 30° C. to 150° C. at 2° C./min and isothermally elution at 150° C. for 15 minutes, and elution flow rate of 0.5 mL/min. Injection loop of 200 uL.

FIG. 16 shows the HT-TGIC chromatograms of an ethylene/n-butyl acrylate/glycidyl methacrylate copolymer, (Trade mark of E.I. DuPont deNemours and Company). LOTRYL® 30BA02 (the trade mark of Arkerna) and homopolymer polyethylene (h-PE) with inventive 'Fractionated SC70-2 silica"-coated 5% graphene as substrate. LOTRYL® 30BA02 is a random copoymer of ethylene and butyl acrylate produced in high pressure radical polymerization process. It contains 28-32 wt % of butyl acrylate. Comparing with h-PE, the presence of 28-32 wt % of n-butyl acrylate (n-BA) comononmer led to a lower elution temperature than h-PE. This indicates that IT-TGIC using the inventive substrate can fractionate ethylene polar copolymer using comonomers other than alpha-olefin comonomers (C3 to C10). GMA has three oxygen atoms, while n-BA has only two oxygen per monomer. GMA is more polar comonomer than n-BA, thus GMA has a stronger interaction with graphene than ethylene units. The ethylene/n-butyl acrylate/ glycidyl methacrylate copolymer chromatogram showed a bimodal distribution. This indicates that HT-TGIC using inventive substrate can be used to characterize the comonomer distributions in ethylene polar copolymers with more than one comonomer. This technique can be used to differentiate two monomer systems from three monomer systems for the ethylene polar copolymers using comonomers other than alpha olefin comonomers.

Figure 17:
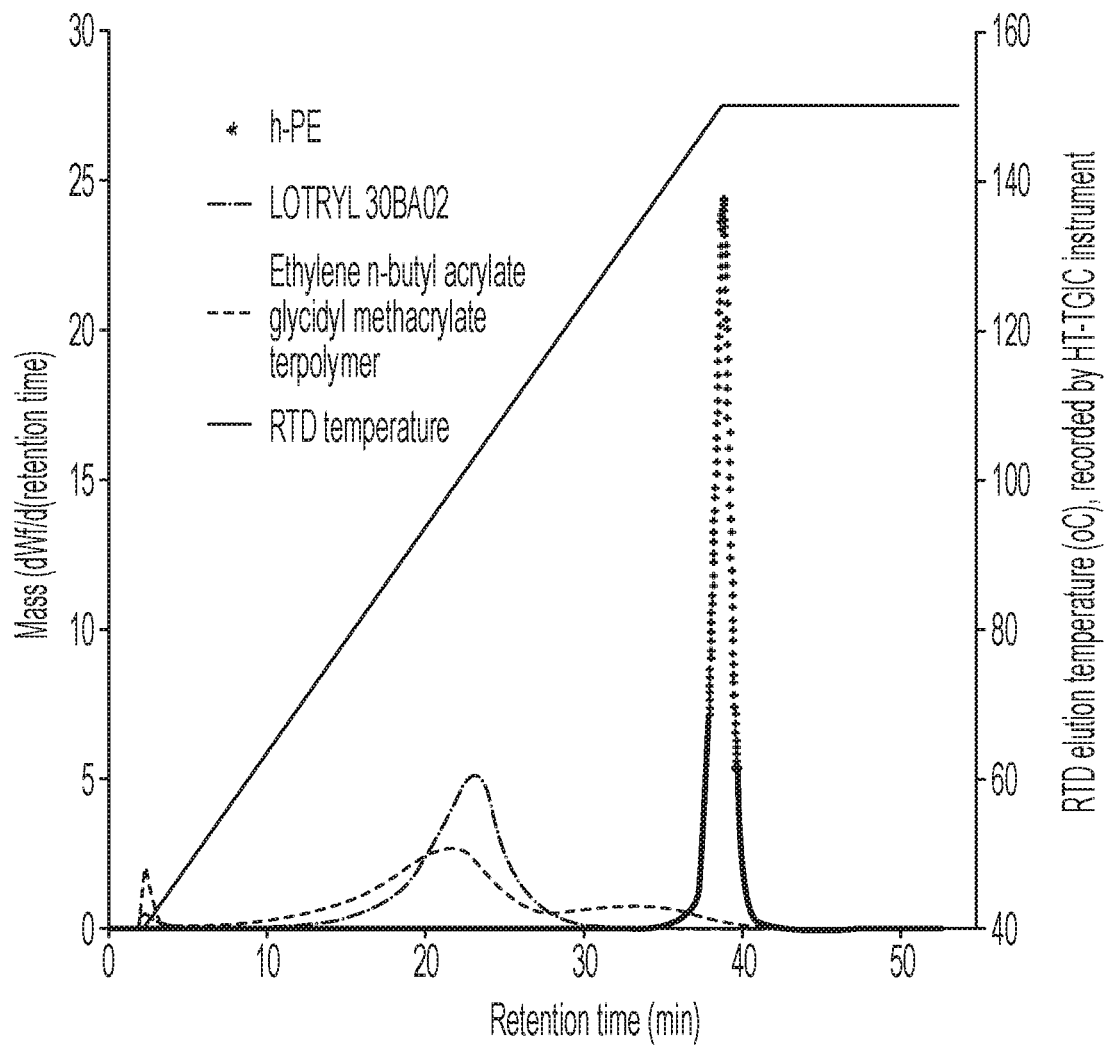
FIG. 17 depicts HT-TGIC chromatograms of ethylene-hexene copolymer grafted with 1% of maleic hydride using the inventive packing material (Silica-10-microns-coated with 5.0% graphene). Column size: 250 (length)×4.6 (ID) (mm), the cooling from 150° C. to 40° C. at 3° C./min, flow rate during cooling 0.02 mL/min, heating rate 40° C. to 150° C. at 2 C/min and elution flow rate of 0.5 mL/min. Injection loop of 200 uL.

Inventive Example #7—"Fractionated SC70-2 Silica"-Coated 5.0 wt % Graphene (Column Size 4.6 (ID)×250 (Length) (Mm) for Maleic Anhydride (MAH) Modified LLDPE FIG. 17 shows the HT-TGIC chromatograms of LLDPE before and with maleic anhydride (MAH) (Mw of 70, 800 and PDI of 2.5) with inventive graphene coated particles as substrate. LLDPE itself appeared at a lower elution temperature than h-PE (at 150° C.). Due to the incorporation of alph-olefin comonomers into LLDPE polymer chains, therefore, LLDPE elute at a temperature below 150° C. Surprisingly, HT-TGIC chromatogram of LLDPE grafted with 1 wt % MAH showed a much longer tailing at high elution temperature (high elution time), and continuously eluted after 40 minutes. The fraction with a much higher elution time is due to presence of grafted MAH. As MAH is a polar group, once LLDPE chains grafting with maleric anhydride, a much stronger interaction between the chains with grafted maleric anhydride and graphene led to an increase in elution temperature (elution time). This inventive materials quantify the properties of the chains grafted with MAH. With the addition of MAH sensitive detector such as C═O sensitive infrared detector and/or molecular weight sensitive detector such as light scattering detector, this inventive material is capable of providing MAH content and Mw at each elution temperature.

The invention claimed is:

1. A packing material for chromatography, the packing material comprising coated particles, wherein the coated particles comprise non-porous particles and a coating composition, wherein:
   the non-porous particles do not comprise a surface treatment and comprise a porosity of less than or equal to 6.0% for pore sizes from 0.0003 to 1 microns;
   a portion of the surface area of the non-porous particles is coated with the coating composition; and
   the coating composition comprises graphene and/or graphene oxide.

2. The packing material of claim 1, wherein the non-porous particles are spherical particles.

3. The packing material of claim 1, wherein coating composition comprising graphene.

4. The packing material of claim 1, wherein the coating composition comprises greater than or equal to 80 wt % graphene, based on the weight of the coating composition.

5. The packing material of claim 1, wherein the coating composition is present in an amount from 1 to 20 wt %, based on the weight of the coated nonporous particles, as determined by TGA.

6. The packing material of claim 1, wherein the non-porous particles have an average diameter less than or equal to 200 microns as determined by ASAP 2405.

7. The packing material of claim 1, wherein the non-porous particles have a D90<4*D50.

8. The packing material of claim 1, wherein the coating composition comprises less than or equal to 1.00 wt % of graphene oxide, based on the weight of the coating composition.

9. The packing material of claim 1, wherein the non-porous particles are selected from the following: metal, silicates, diamond, silicon carbide, metal particles, clays, talc, or a combination thereof.

10. The packing material of claim 1, wherein for each coated particle, the coating composition is in contact with the outer surface of the non-porous particle.

11. The packing material of claim 1, wherein the non-porous particles have a total surface area less than or equal to 100 $m^2/g$ as determined by ASAP 2405.

* * * * *